(12) United States Patent
Chen et al.

(10) Patent No.: US 12,547,294 B2
(45) Date of Patent: *Feb. 10, 2026

(54) NAVIGATION BAR DISPLAY METHOD, DISPLAY METHOD, AND FIRST ELECTRONIC DEVICE

(71) Applicant: Huawei Technologies Co., Ltd., Shenzhen (CN)

(72) Inventors: Jiazi Chen, Shenzhen (CN); Hejin Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

This patent is subject to a terminal disclaimer.

(21) Appl. No.: 18/044,104

(22) PCT Filed: Aug. 20, 2021

(86) PCT No.: PCT/CN2021/113870
§ 371 (c)(1),
(2) Date: Mar. 6, 2023

(87) PCT Pub. No.: WO2022/048461
PCT Pub. Date: Mar. 10, 2022

(65) Prior Publication Data
US 2024/0012534 A1 Jan. 11, 2024

(30) Foreign Application Priority Data
Sep. 7, 2020 (CN) .......................... 202010930823.X

(51) Int. Cl.
*G06F 3/14* (2006.01)
*G06F 3/0482* (2013.01)
*G06F 3/04845* (2022.01)

(52) U.S. Cl.
CPC ........ *G06F 3/0482* (2013.01); *G06F 3/04845* (2013.01)

(58) Field of Classification Search
CPC .. G06F 3/1454; G06F 3/0482; G06F 3/04845; G06F 3/04886; G06F 2203/04803
See application file for complete search history.

(56) References Cited

U.S. PATENT DOCUMENTS 7,634,742 B2 * 12/2009 Sawyer ................. G06F 3/0481
715/842
11,314,391 B2 * 4/2022 Zhang ................... G06F 3/0482
(Continued)

FOREIGN PATENT DOCUMENTS

CN 108491131 A 9/2018
CN 110471639 A 11/2019
(Continued)

*Primary Examiner* — Alvin H Tan
(74) *Attorney, Agent, or Firm* — Conley Rose, P.C.

(57) ABSTRACT

A navigation bar display method includes a first electronic device that receives first interface information and second interface information from a second electronic device; displays a first interface of the second electronic device in a first window based on the first interface information; displays a second interface of the second electronic device in a second window based on the second interface information; displays a navigation bar; receives, in response to a first operation on a button on the navigation bar, third interface information from the second electronic device; and displays a third interface of the second electronic device in the first window or the second window based on the third interface information.

20 Claims, 20 Drawing Sheets

(56) References Cited

U.S. PATENT DOCUMENTS

| | | | | |
|---|---|---|---|---|
| 11,416,131 | B2* | 8/2022 | Reeves | G06F 3/1446 |
| 11,809,704 | B2* | 11/2023 | Gu | G06F 3/1454 |
| 2009/0100380 | A1* | 4/2009 | Gardner | G06F 3/0483 |
| | | | | 715/854 |
| 2021/0263642 | A1* | 8/2021 | Li | G06F 3/0486 |
| 2022/0300153 | A1 | 9/2022 | Gu et al. | |

FOREIGN PATENT DOCUMENTS

| | | |
|---|---|---|
| CN | 110673782 A | 1/2020 |
| CN | 110708086 A | 1/2020 |
| CN | 111327769 A | 6/2020 |

\* cited by examiner (a)

(b)

(a)

(b)

NAVIGATION BAR DISPLAY METHOD, DISPLAY METHOD, AND FIRST ELECTRONIC DEVICE

CROSS-REFERENCE TO RELATED APPLICATIONS

This is a U.S. National Stage of International Patent Application No. PCT/CN2021/113870 filed on Aug. 20, 2021, which claims priority to Chinese Patent Application No. 202010930823.X; filed on Sep. 7, 2020. Both of the aforementioned applications are hereby incorporated by reference in their entireties.

TECHNICAL FIELD

This application relates to the field of projection technologies, and in particular, to a navigation bar display method, a display method, and a first electronic device.

BACKGROUND

Multi-screen interaction is an emerging technology, and means transmission, display, and the like of multimedia (for example, audio, video, and picture) content on different electronic devices. For example, a movie on a mobile phone may be played on a television, a picture on a tablet computer may be displayed on a television, and content of a computer may be projected onto a television for playing. Certainly, multi-screen interaction is not limited to a picture and a video, and may further include various applications on an electronic device. For example, an application on a mobile phone may be displayed on a television, and the application is operated through the television.

However, a current multi-screen interaction technology is not mature. Projection from a mobile phone onto a PC is used as an example. Because a user has different operation habits on the mobile phone and the PC, after the mobile phone performs projection onto the PC, the operation habits of the user on the mobile phone are not adapted to the PC. For example, as shown in FIG. 1, on a mobile phone, a user is accustomed to using a gesture operation, for example, sliding right to return to a previous step. However, it is difficult to use a mouse and a keyboard to achieve effects of the gesture operations on the PC.

SUMMARY

An objective of this application is to provide a navigation bar display method, a display method, and a first electronic device, to help improve human-computer interaction experience in a projection scenario.

According to a first aspect, a navigation bar display method is provided. The method includes: A first electronic device receives first interface information and second interface information that are sent by a second electronic device. The first electronic device displays a first interface of the second electronic device in a first window based on the first interface information. The first electronic device displays a second interface of the second electronic device in a second window based on the second interface information. The first electronic device displays a navigation bar, where the navigation bar includes at least one button. The first electronic device receives a first operation on the button. The first electronic device receives, in response to the first operation, third interface information sent by the second electronic device. The first electronic device displays a third interface of the second electronic device in the first window or the second window based on the third interface information.

For example, the first electronic device is a PC, and the second electronic device is a mobile phone. When the mobile phone performs projection onto the PC, the PC may display projected content of the mobile phone in a multi-window manner, and the PC may further display a navigation bar, to control a multi-window display interface. Usually, on the mobile phone, a user is accustomed to using a gesture, a physical button, or the like. However, when the mobile phone performs projection onto the PC, the gesture or the physical button cannot be projected onto the PC. According to the solution provided in this application, the navigation bar is displayed on the PC, and the user can control, through the navigation bar on the PC, the display interface obtained through projection from the mobile phone. This better complies with an operation habit of the user.

With reference to the first aspect, in a possible implementation of the first aspect, that the first electronic device displays a third interface of the second electronic device in the first window or the second window includes: if the first window is a focus window, displaying the third interface of the second electronic device in the first window; or if the second window is a focus window, displaying the third interface of the second electronic device in the second window. The focus window may be understood as a window that the user currently pays attention to. To be specific, the user may control, through the navigation bar on the PC, a display interface of the window that the user currently pays attention to, thereby improving interaction experience.

With reference to the first aspect, in a possible implementation of the first aspect, the method further includes: The PC determines the first window as the focus window when detecting that a mouse arrow hovers over in the first window; or the PC determines the second window as the focus window when detecting that a mouse arrow hovers over in the second window. Alternatively, the PC determines the first window as the focus window when detecting that the first window is selected through a mouse; or the PC determines the second window as the focus window when detecting that the second window is selected through a mouse. For example, that the PC detects that the first window is selected through a mouse may be: detecting a click operation (click or double-click) of the mouse arrow in the first window; and that the PC detects that the second window is selected through a mouse may be: detecting a click operation (click or double-click) of the mouse arrow in the second window. On the PC, the user is accustomed to using the mouse. According to the technical solution of this application, when the mobile phone performs projection onto the PC, the multi-window on the PC displays the projected content of the mobile phone, and further display the navigation bar. The user may operate the navigation bar through the mouse to control the multi-window display interface. This complies with a use habit of the user on the PC.

With reference to the first aspect, in a possible implementation of the first aspect, that the first electronic device displays a navigation bar includes: The first electronic device displays the navigation bar on a taskbar of the first electronic device. For example, the first electronic device is a PC, and the second electronic device is a mobile phone. Usually, the taskbar of the PC is disposed in an area below a display screen of the PC, and a location is fixed. The user views the navigation bar at the fixed location, and this is easy to remember. In addition, the taskbar of the PC usually includes an icon of a local application of the PC. Therefore, when the navigation bar is displayed on the taskbar, this more complies with an operation habit on the PC.

Alternatively, the first electronic device displays the navigation bar on a display screen of the first electronic device in a hovering manner. To be specific, the navigation bar and the window are independent of each other, the position of the navigation bar may change, and the user may move the position based on a requirement of the user, to facilitate an operation.

Alternatively, the first electronic device displays the navigation bar in the first window and/or the second window. The first window may include a title bar above the first window, an operation bar below the first window, and/or left and right sides of the first window; and the second window may include a title bar above the second window, an operation bar below the second window, and/or left and right sides of the second window.

For example, it is assumed that a quantity of navigation bars is 1, that is, one navigation bar may be used to control a plurality of windows. The navigation bar may be displayed on the operation bar below the first window, the title bar above the first window, or the left and right sides of the first window; or the navigation bar may be displayed on the operation bar below the second window, the title bar above the second window, or the left and right sides of the second window. For another example, it is assumed that a quantity of navigation bars is not 1. For example, the navigation bar includes a first navigation bar and a second navigation bar, the first navigation bar is used to control the first window, and the second navigation bar is used to control the second window. Buttons on the first navigation bar and the second navigation bar may not be completely the same. The first navigation bar may be displayed on the operation bar below the first window, the title bar above the first window, or the left and right sides of the first window. The second navigation bar may be displayed on the operation bar below the second window, the title bar above the second window, or the left and right sides of the second window. That is, a plurality of navigation bars are displayed on the PC, and each navigation bar is used to control a display interface of one window, to facilitate the user to control each window.

With reference to the first aspect, in a possible implementation of the first aspect, the first window is a primary window, the second window is a secondary window, and is configured to control a touch control function of a preset button on the second navigation bar of the second window to be disabled. The first window is the primary window, and includes: an earliest created window for the first window and the second window, for example, the first window that is created for displaying an interface of the second electronic device when the first electronic device receives projection from the second electronic device. The second window is the secondary window, and includes: a window created in response to an operation performed on the first window to separate the second window. The preset button may be a default fixed button or a customized button. This is not limited in this embodiment of this application. For example, the navigation bar includes three buttons: a back button used to return to a previous step, a home button used to return to a home screen, and a multi-task button used to open a multi-task. The preset button may be the home button used to return to a home screen and the multi-task button used to open a multi-task, that is, used to control touch functions of the home button and the multi-task button on the navigation bar in the secondary window to be disabled. In this manner, it may be convenient for the user to distinguish between the primary window and the secondary window.

With reference to the first aspect, in a possible implementation of the first aspect, the electronic device displays the navigation bar at a first position, and the method further includes: The first electronic device displays the navigation bar at a second position in response to a second operation on the navigation bar, where the first position is different from the second position. That is, the user may adjust a display position of the navigation bar on the PC. This is flexible and has better user interaction experience.

With reference to the first aspect, in a possible implementation of the first aspect, the method further includes: In response to a third operation on a first button on the navigation bar, the first electronic device removes the navigation bar to display the first button. That is, the user may remove the first button (for example, one or more buttons) on the navigation bar from the navigation bar for display. For example, the user may remove the first button to a position that the user is accustomed to, so that interaction experience is better.

With reference to the first aspect, in a possible implementation of the first aspect, the method further includes: The first electronic device moves, in response to the operation on the first button, the first button back to the navigation bar for display. That is, the button on the navigation bar may not only be removed for display, but also may be moved back to the navigation bar for display after being removed from the navigation bar. Therefore, the design is flexible and interaction is higher.

With reference to the first aspect, in a possible implementation of the first aspect, the navigation bar includes displayed buttons and undisplayed buttons, and the first button is one or more of the displayed buttons, or the first button is one or more of the undisplayed buttons. For example, a quantity of buttons displayed on the navigation bar is 3, and the navigation bar further includes buttons that are undisplayed (for example, three candidate buttons). The user may control, by performing a specific triggering operation, the buttons that are undisplayed on the navigation bar to be displayed. In this case, the user may select a button to be removed from the six buttons. In this manner, more selectable buttons are provided for the user, and it is more convenient for the user to control the mobile phone on the PC.

With reference to the first aspect, in a possible implementation of the first aspect, the method further includes: The first electronic device receives a fourth operation on the navigation bar; and the first electronic device changes, in response to the fourth operation, the button displayed on the navigation bar. That is, the user may change the button on the navigation bar. For example, the user may display, on the navigation bar, the button that the user is accustomed to using (where for example, the button used to open the multi-task or the button used to return to the home screen).

With reference to the first aspect, in a possible implementation of the first aspect, the navigation bar includes the displayed buttons and the undisplayed buttons, and that the first electronic device changes the button displayed on the navigation bar includes: The first electronic device displays the undisplayed buttons on the navigation bar. For example, three buttons are displayed on the navigation bar, and the navigation bar further includes the buttons that are undisplayed, for example, one button. In response to the fourth operation, the PC may display the button that is undisplayed. That is, a quantity of displayed buttons on the navigation bar changes from three to four, and the user may have more optional buttons. Alternatively, three buttons are displayed on the navigation bar, and in response to the fourth operation, the first electronic device replaces one or more of the three buttons with another button (for example, removes a displayed button from the navigation bar and displays an undisplayed button at a vacated position). That is, a quantity of buttons on the navigation bar remains unchanged, to avoid an unintentional touch of a button caused by an excessively large quantity of buttons.

With reference to the first aspect, in a possible implementation of the first aspect, the at least one button on the navigation bar includes: a back button used to return to a previous step, a home button used to return to a home screen, a multi-task button used to open a multi-task, and/or a forward button used to enter a next step. It should be noted that the buttons listed herein are merely examples and are not limited, and other buttons may also be used. It should be understood that on the mobile phone, the user is accustomed to using a gesture, a physical button, or the like. For example, a slide-left gesture is used to return to a previous step, a slide-right gesture is used to enter a next step, and a slide-up gesture is used to return to a home screen. When the mobile phone performs projection onto the PC, the gesture or the physical button cannot perform projection. According to the solution provided in this application, the user may implement, through the navigation bar on the PC, a function that is the same as the gesture operation or the physical button on the mobile phone, and map the gesture operation or the physical button on the mobile phone to a button on the navigation bar on the PC. In this way, it is more convenient to perform an operation on the PC through a mouse.

According to a second aspect, a display method is further provided. The method includes: A first electronic device displays an interface of the first electronic device; the first electronic device receives N pieces of interface information, of N interfaces, sent by a second electronic device, where N is an integer greater than or equal to 1; the second electronic device respectively displays the N interfaces in N windows based on the N pieces of interface information; and the first electronic device displays at least one button on a taskbar, where the button is used to control the N interfaces respectively displayed in the N windows.

For example, the first electronic device is a PC, and the second electronic device is a mobile phone. When the mobile phone performs projection onto the PC, the PC may display, in a multi-window manner, an interface projected from the mobile phone, and the PC displays at least one button on a taskbar, to control a multi-window display interface. Usually, the taskbar is disposed in an area below a display screen of the PC, and a location is fixed. Therefore, a user may view a button at the fixed location, and this is easy to remember. In addition, the taskbar of the PC usually includes an icon of a local application of the PC. Therefore, when the button is displayed on the taskbar, this more complies with an operation habit of the user on the PC.

With reference to the first aspect, in a possible implementation of the first aspect, N is greater than or equal to 2, and the N interfaces include an interface displayed in a foreground and an interface displayed in a background of the second electronic device. In other words, the mobile phone may project the foreground display interface and the background display interface onto the PC, and the PC displays the foreground display interface and the background display interface in a multi-window manner.

With reference to the first aspect, in a possible implementation of the first aspect, the at least one button includes: a back button used to return to a previous step, a home button used to return to a home screen, a multi-task button used to open a multi-task, and/or a forward button used to enter a next step. It should be noted that the buttons listed herein are merely examples and are not limited, and other buttons may also be used. It should be understood that on the mobile phone, the user is accustomed to using a gesture, a physical button, or the like. For example, a slide-left gesture is used to return to a previous step, a slide-right gesture is used to enter a next step, and a slide-up gesture is used to return to a home screen. When the mobile phone performs projection onto the PC, projection cannot be performed through the gesture or the physical button. According to the solution provided in this application, the user may implement, through a button on the taskbar of the PC, a function that is the same as the gesture operation or the physical button on the mobile phone, and map the gesture operation or the physical button on the mobile phone to the button on the taskbar of the PC. In this way, it is more convenient to perform an operation on the PC through a mouse.

The button may be used to control a plurality of windows that are used to display the interface of the second electronic device. For example, when a window A and a window B are included, the button may be used to control an interface displayed in the window A, and may also be used to control an interface displayed in a window displayed in the window B. A specific window is specifically controlled may be determined according to the following rules.

With reference to the first aspect, in a possible implementation of the first aspect, N is greater than or equal to 2, and the method further includes: The first electronic device receives a first operation on the button; the first electronic device receives, in response to the first operation, first interface information sent by the second electronic device; and the first electronic device displays a first interface of the second electronic device in a focus window in the N windows based on the first interface information, where the first interface is different from the N interfaces, and the first interface information is different from the N pieces of interface information. In other words, when the mobile phone performs projection onto the PC, the PC displays projected content of the mobile phone in a multi-window manner, the button is displayed on the taskbar of the PC, and the PC displays, in response to the first operation on the button, the first interface in the focus window in a multi-window manner.

Alternatively, the first interface may be a specific interface of the N interfaces. That is, the interface in the focus window is switched to an interface in a specific window of the N windows.

With reference to the first aspect, in a possible implementation of the first aspect. N is greater than or equal to 2, and the method further includes: The first electronic device receives a first operation on the button; the first electronic device receives, in response to the first operation, first interface information sent by the second electronic device; and the first electronic device displays a first interface of the second electronic device in a primary window of the N windows based on the first interface information, where an earliest window is created in the primary window of the N windows, the first interface is different from the N interfaces, and the first interface information is different from the N pieces of interface information. In other words, when the mobile phone performs projection onto the PC, the PC displays projected content of the mobile phone in a multi-window manner, the button is displayed on the taskbar of the PC, and the PC displays, in response to the first operation on the button, the first interface in the primary window in a multi-window manner. For example, the primary window may be the first window that is created by the PC and that is used to display a projection interface of the mobile phone when the mobile phone performs projection onto the PC.

Alternatively, the first interface may be a specific interface of the N interfaces. That is, the interface in the primary window is switched to an interface in a specific window of the N windows.

With reference to the first aspect, in a possible implementation of the first aspect, N is greater than or equal to 2, and the method further includes: The first electronic device receives a first operation on the button; the first electronic device receives, in response to the first operation, first interface information sent by the second electronic device; and the first electronic device displays a first interface of the second electronic device in the $(N+1)^{th}$ window based on the first interface information, where the first interface is different from the N interfaces, and the first interface information is different from the N pieces of interface information. In other words, when the mobile phone performs projection onto the PC, the PC displays projected content of the mobile phone in a multi-window manner, the button is displayed on the taskbar of the PC, and the PC displays, in response to the first operation on the button, the first interface in a newly created window (namely, the $(N+1)^{th}$ window).

Alternatively, the first interface may be a specific interface of the N interfaces. That is, the interface in the newly created window is an interface in a specific window of the N windows.

With reference to the first aspect, in a possible implementation of the first aspect, the method further includes: The first electronic device receives a fourth operation on the button; the first electronic device displays L interface identifiers in response to the fourth operation, where the L identifiers are respectively used to represent L interfaces of the second electronic device; the first electronic device receives a fifth operation of selecting a third interface identifier from the L interface identifiers; and the first electronic device displays a fourth interface in the $(N+1)^{th}$ window in response to the fifth operation, where the third interface identifier is an interface identifier of the fourth interface. That is, the PC displays a plurality of interface identifiers in response to the operation on the button on the taskbar of the PC, and the user may select one interface identifier from the plurality of interface identifiers. In this case, an interface corresponding to the interface identifier is displayed in a newly created window (namely, the $(N+1)^{th}$ window).

With reference to the first aspect, in a possible implementation of the first aspect, the method further includes: The first electronic device displays, on the taskbar, the third interface identifier corresponding to the fourth interface. In other words, after the user selects the third interface identifier from the L interface identifiers, the third interface corresponding to the third interface identifier is displayed in the newly created window, and the third interface identifier is removed from the L interface identifiers for display, that is, the third interface identifier and the button (for example, a multi-task button) are independently displayed on the taskbar. In this way, the user may determine, by using the interface identifier on the taskbar, specific interfaces that are displayed and specific interfaces that are undisplayed.

With reference to the first aspect, in a possible implementation of the first aspect, the N windows include a first window, the N interfaces include a second interface, the first electronic device displays the second interface in the first window, and the method further includes: The first electronic device receives a second operation on the button; the first electronic device displays M interface identifiers and a first interface identifier in response to the second operation, where the first interface identifier is used to represent the second interface, and the M interface identifiers are respectively used to represent M interfaces of the second electronic device; the first electronic device receives a third operation of selecting a second interface identifier from the M interface identifiers; and the first electronic device displays a third interface in the first window in response to the third operation, where the second interface identifier is an interface identifier of the third interface. In other words, the PC displays projected content of the mobile phone in a multi-window manner, and the first interface identifier of the first window and the M interface identifiers are separately displayed. For example, the first window may be a primary window, a secondary window, or a focus window in the N windows on the PC, and the M interfaces corresponding to the M interface identifiers are interfaces of a foreground or background of the second electronic device or interfaces of common applications of the user. The user may select one interface identifier from the M interface identifiers, and an interface corresponding to the interface identifier is displayed in the first window.

According to a third aspect, a first electronic device is further provided. The first electronic device includes:
one or more processors; and
one or more memories, where
the one or more memories store one or more computer programs, the one or more computer programs include instructions, and when the instructions are executed by the one or more processors, the first electronic device is enabled to perform the following steps:
receiving first interface information and second interface information that are sent by a second electronic device;
displaying a first interface of the second electronic device in a first window based on the first interface information;
displaying a second interface of the second electronic device in a second window based on the second interface information;
displaying a navigation bar, where the navigation bar includes at least one button;
receiving a first operation on the button;
receiving, in response to the first operation, third interface information sent by the second electronic device; and
displaying a third interface of the second electronic device in the first window or the second window based on the third interface information.

With reference to the first aspect, in a possible implementation of the first aspect, when the instructions are executed by the one or more processors, the first electronic device is enabled to specifically perform the following steps:
if the first window is a focus window, displaying a third interface of the second electronic device in the first window; or
if the second window is a focus window, displaying a third interface of the second electronic device in the second window.

With reference to the first aspect, in a possible implementation of the first aspect, when the instructions are executed by the one or more processors, the first electronic device is enabled to specifically perform the following steps:
displaying the navigation bar on a taskbar of the first electronic device;
displaying the navigation bar on a display screen of the first electronic device in a hovering manner; or displaying the navigation bar in the first window and/or the second window.

With reference to the first aspect, in a possible implementation of the first aspect, the electronic device displays the navigation bar at a first position, and when the instructions are executed by the one or more processors, the first electronic device is further enabled to perform the following step: The first electronic device displays the navigation bar at a second position in response to a second operation on the navigation bar, where the first position is different from the second position.

With reference to the first aspect, in a possible implementation of the first aspect, when the instructions are executed by the one or more processors, the first electronic device is further enabled to perform the following step: In response to a third operation on a first button on the navigation bar, the first electronic device removes the navigation bar to display the first button.

With reference to the first aspect, in a possible implementation of the first aspect, when the instructions are executed by the one or more processors, the first electronic device is further enabled to perform the following steps:
receiving a fourth operation on the navigation bar; and
changing, in response to the fourth operation, the button displayed on the navigation bar.

With reference to the first aspect, in a possible implementation of the first aspect, the at least one button includes: a back button used to return to a previous step, a home button used to return to a home screen, a multi-task button used to open a multi-task, and/or a forward button used to enter a next step.

According to a fourth aspect, a first electronic device is further provided. The first electronic device includes:
one or more processors; and
one or more memories, where
the one or more memories store one or more computer programs, the one or more computer programs include instructions, and when the instructions are executed by the one or more processors, the first electronic device is enabled to perform the following steps:
displaying an interface of the first electronic device;
receiving N pieces of interface information of N interfaces that are sent by a second electronic device, where N is an integer greater than or equal to 1;
respectively displaying the N interfaces in N windows based on the N pieces of interface information; and
displaying at least one button on a taskbar, where the button is used to control the N interfaces respectively displayed in the N windows.

With reference to the first aspect, in a possible implementation of the first aspect, the at least one button includes:
a back button used to return to a previous step, a home button used to return to a home screen, a multi-task button used to open a multi-task, and/or a forward button used to enter a next step.

With reference to the first aspect, in a possible implementation of the first aspect, N is greater than or equal to 2, and when the instructions are executed by the one or more processors, the first electronic device is further enabled to perform the following steps:
receiving a first operation on the button;
receiving, in response to the first operation, first interface information sent by the second electronic device; and
displaying a first interface of the second electronic device in a focus window in the N windows based on the first interface information, where the first interface is different from the N interfaces, and the first interface information is different from the N pieces of interface information.

With reference to the first aspect, in a possible implementation of the first aspect, the N windows include a first window, the N interfaces include a second interface, the first electronic device displays the second interface in the first window, and when the instructions are executed by the one or more processors, the first electronic device is further enabled to perform the following steps:
receiving a second operation on the button;
displaying M interface identifiers and a first interface identifier in response to the second operation, where the first interface identifier is used to represent the second interface, and the M interface identifiers are respectively used to represent M interfaces of the second electronic device;
receiving a third operation of selecting a second interface identifier from the M interface identifiers; and
displaying a third interface in the first window in response to the third operation, where the second interface identifier is an interface identifier of the third interface.

With reference to the first aspect, in a possible implementation of the first aspect, when the instructions are executed by the one or more processors, the first electronic device is further enabled to perform the following steps:
receiving a fourth operation on the button;
displaying L interface identifiers in response to the fourth operation, where the L identifiers are respectively used to represent L interfaces of the second electronic device;
receiving a fifth operation of selecting a third interface identifier from the L interface identifiers; and
displaying a fourth interface in the $(N+1)^{th}$ window in response to the fifth operation, where the third interface identifier is an interface identifier of the fourth interface.

According to a fifth aspect, an embodiment of this application further provides an electronic device. The electronic device includes modules/units that perform the method according to any one of the first aspect or the possible designs of the first aspect; or the electronic device includes modules/units that perform the method according to any one of the second aspect or the possible designs of the second aspect. These modules/units may be implemented by hardware, or may be implemented by hardware by executing corresponding software.

According to a sixth aspect, a system is further provided. The system includes:
a first electronic device; and
a second electronic device, configured to perform screen projection onto the first electronic device, where
the first electronic device is the first electronic device provided in the third aspect or the first electronic device provided in the fourth aspect.

According to a seventh aspect, an embodiment of this application further provides a chip. The chip is coupled to a memory in an electronic device, and is configured to invoke a computer program stored in the memory and perform the technical solution according to any one of the first aspect and the possible designs of the first aspect in embodiments of this application, or is configured to invoke a computer program stored in the memory and perform the technical solution according to any one of the second aspect and the possible designs of the second aspect in embodiments of this application. In embodiments of this application, "coupling" means that two components are directly or indirectly combined with each other.

According to an eighth aspect, a computer-readable storage medium is further provided. The computer-readable storage medium includes a computer program. When the computer program is run on an electronic device, the electronic device performs the method provided in the first aspect; or when the computer program is run on an electronic device, the electronic device performs the method provided in the second aspect.

According to a ninth aspect, a program product is further provided. The program product includes instructions. When the instructions are run on a computer, the computer is enabled to perform the method provided in the first aspect; or when the instructions are run on a computer, the computer is enabled to perform the method provided in the second aspect.

According to a tenth aspect, a graphical user interface on an electronic device is further provided. The electronic device has a display screen, one or more memories, and one or more processors, the one or more processors are configured to execute one or more computer programs stored in the one or more memories, and the graphical user interface includes a graphical user interface displayed when the electronic device performs the method provided in the first aspect or the method provided in the second aspect.

For beneficial effects of the third aspect to the tenth aspect, refer to the beneficial effects of the first aspect and the second aspect. Details are not described again.

DESCRIPTION OF EMBODIMENTS

Figure 1:
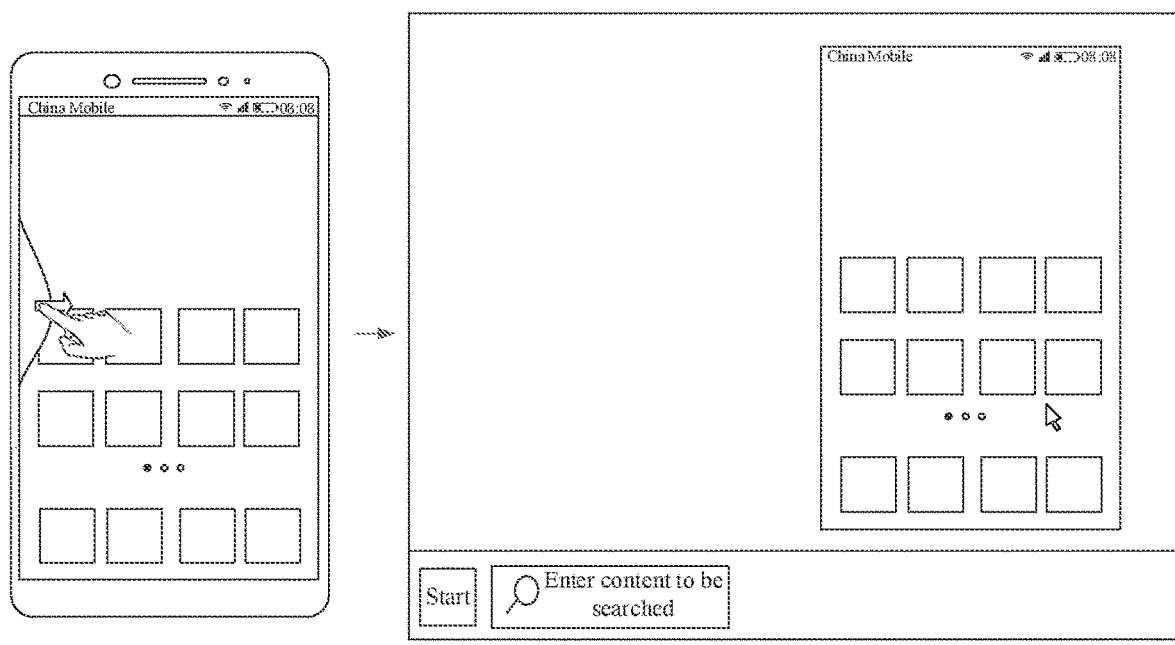
FIG. 1 is a schematic diagram of current projection from a mobile phone onto a PC according to an embodiment of this application.

The following first explains and describes some terms in embodiments of this application.

(1) An application (application, app for short) is a software program that can implement one or more specific functions. Usually, a plurality of applications may be installed on an electronic device, for example, an instant messaging application, a video application, an audio application, and an image shooting application. The instant messaging application may include, for example, a short message service message application, MeeTime, WeChat (WeChat), WhatsApp Messenger, Line (Line), Instagram (Instagram), Kakao Talk, and DingTalk. The image shooting application may include, for example, a camera application (a system camera or a third-party camera application). The video application may include, for example, YouTube, Twitter, TikTok, iQIYI, and Tencent Video. The audio application may include, for example, Google Music, KuGou, EMUMO, and QQ Music. The application in the following embodiments may be an application installed before delivery of the electronic device, or may be an application downloaded from a network or obtained from another electronic device by a user in a process of using the electronic device.

(2) Gesture navigation is a function disposed on an electronic device (usually a touchscreen electronic device), and specifically, a function of operating and controlling the electronic device through a gesture operation of a user A mobile phone is used as an example. A gesture navigation switch is disposed on the mobile phone, and the user enables or disables gesture navigation through the switch. If the gesture navigation is enabled, the user may control the electronic device through the gesture operation. For example, a slide-up operation on a display screen of the mobile phone may be used to return to a home screen, a slide-right operation may be used to return to a previous step, a slide-left operation may be used to enter a next step, and a slide operation from a lower left corner to an upper right corner may be used to display a multi-task interface. Returning to a previous step may be understood as returning from a current interface to a previous interface, where the previous interface refers to a previous interface that has been displayed before the current interface. Entering a next step may be understood as switching from a current interface to a next interface, where the next interface refers to a next interface that has been historically displayed after the current interface.

(3) In embodiments of this application, "at least one" means one or more, and "a plurality of" means two or more. In addition, it should be understood that in descriptions of this application, words such as "first" and "second" are merely intended for purposes of distinguishing the descriptions, and cannot not be understood as expressing or implying relative importance or a sequence.

The following specifically describes embodiments of this application with reference to the accompanying drawings.

This application provides a projection display method. The method is applicable to a projection scenario, and the projection scenario includes projection from a first electronic device onto a second electronic device. The first electronic device may be a mobile phone, a tablet computer, a PC, or the like. The second electronic device may be a PC, a television, or the like. The following mainly uses an example in which the first electronic device is a mobile phone and the second electronic device is a PC for description.

In the projection display method provided in this application, when the mobile phone performs projection onto the PC, the PC may display a navigation bar. The navigation bar may include one or more buttons, for example, a button used to return to a home page, or a button used to return to a previous step. A user may click the button on the navigation bar to return to the home page or return to the previous step. Therefore, when the mobile phone performs projection onto the PC, the user may control the mobile phone through the navigation bar on the PC. This better complies with an operation habit of the user on the mobile phone.

Figure 2:
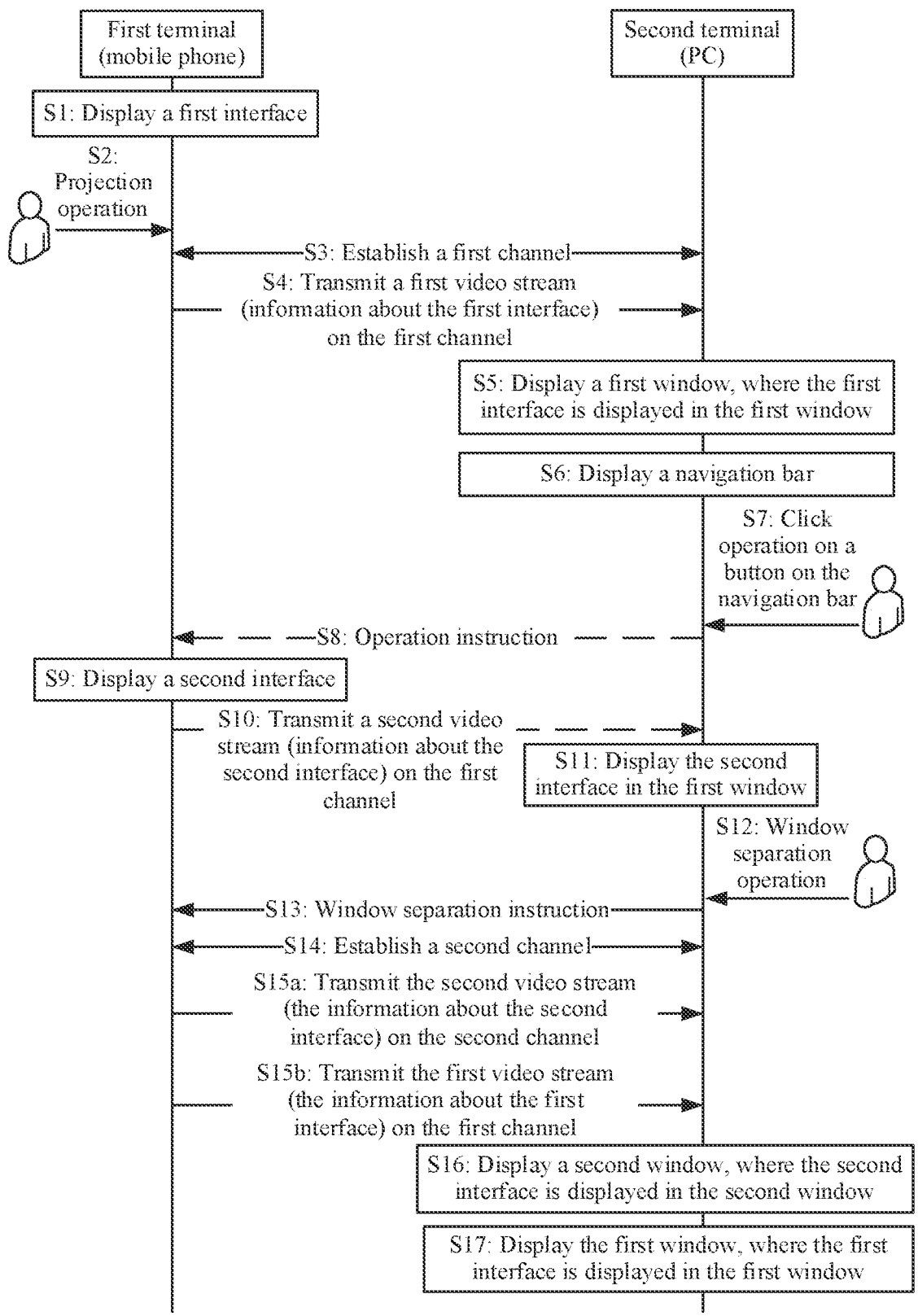
FIG. 2 is a schematic flowchart of a projection display method according to an embodiment of this application.

The following uses a flowchart shown in FIG. 2 as an example, to describe a process of projection from a mobile phone onto a PC. Specifically, as shown in FIG. 2, a procedure of the projection display method in this application may include S1 to S17. S1 to S6 are used to describe a process in which the PC displays a navigation bar when the mobile phone performs projection onto the PC. S7 to S11 are used to describe a process in which a user performs an operation through the navigation bar. S12 to S17 are used to describe a process in which projected content of the mobile phone is displayed on the PC in a multi-window manner.

S1: The mobile phone displays a first interface.

The first interface may be any interface of the mobile phone, for example, a home screen of the mobile phone in FIG. 1, or an interface of an application. A video playback application is used as an example. The first interface may be a movie interface currently played by the video playback application. An instant messaging application is used as an example. The first interface may be a home page of the instant messaging application, a chat interface with a contact, or the like.

S2: The mobile phone detects a projection operation.

For example, a shortcut operation icon used for projection is disposed on the mobile phone, and the projection operation may be an operation (for example, a click operation) on the shortcut operation icon. A display position of the shortcut operation icon is not limited in this embodiment of this application. For example, the shortcut operation icon is displayed in a slide-up menu or displayed in a setting application. Certainly, in addition to the operation on the shortcut operation image, the projection operation may alternatively be another operation, for example, a gesture operation of sliding up with two fingers or three fingers. This is not limited in this embodiment of this application. It should be noted that the projection operation may alternatively be received on the PC. For example, the PC displays a plurality of device identifiers of scanned electronic devices, and the user may select a target device identifier such as a mobile phone identifier from the device identifiers. In this case, the PC may send a projection instruction to the mobile phone, to instruct the mobile phone to perform projection onto the PC.

S3: The mobile phone establishes a first channel with the PC.

Before S3, the method may further include the following steps: The mobile phone displays device identifiers of a plurality of to-be-selected devices, for example, a television identifier or a PC identifier. When detecting an operation of selecting the PC identifier, the mobile phone performs S3. Specifically, for example, a process in which the mobile phone establishes the first channel with the PC may include: The mobile phone sends a projection request to the PC, to request projection onto the PC. After receiving the projection request, if the PC agrees to the projection, the PC returns a consent response to the mobile phone, and establishes a connection to the mobile phone. The connection may be, for example, a wireless Wi-Fi connection and/or a Bluetooth connection. The first channel may be understood as a first channel, and corresponds to one transmission bandwidth, namely, a frequency bandwidth. The mobile phone may establish a plurality of channels with the CP. In this case, the first channel is any one of the plurality of channels. Different channels correspond to different transmission bandwidths (namely, frequency bandwidths).

Before S3, the method may further include another step. For example, the mobile phone determines whether the PC and the mobile phone support a same projection protocol, and if yes, establishes a connection to the PC; otherwise, cannot establish a connection. The projection protocol includes but is not limited to miracast, airplay, lelink, and the like.

S4: The mobile phone sends a first video stream to the PC through the first channel, where the first video stream includes information about the first interface.

That the mobile phone sends the first video stream may be understood as that a screenshot of the first interface on the mobile phone is sent in real time, and may be sent frame by frame, or may be sent together by packing a plurality of frames. An example of performing sending through packing is used. Before S4, the method may further include other steps: performing processes such as packaging, compression, and encoding (encode) on a multi-frame screenshot. There are a plurality of encoding modes such as H.264, MPEG-4, and MPEG-2. Correspondingly, a receiving end may perform processes such as decoding (decode) and decompression.

S5: The PC displays a first window, where the first interface is displayed in the first window.

An area of the first window may be smaller than an area of a display screen of the PC. For example, the area of the first window is a preset area, and the preset area is a fixed area that is set by default, or may be an area customized by the user; or the area of the first window is determined based on an area of a display screen of the receiving end (for example, the PC). For example, assuming that the area of the display screen of the receiving end is: a length a and a width b, the area of the first window may be: a length c and a width d, where c/a=a preset value 1, and d/b=a preset value 2. The preset value 1 and/or the preset value 2 are/is less than 1. In other words, the area of the first window is adjusted proportionally based on the area of the display screen of the receiving end, so that the first window has different areas when the first window is displayed on different receiving ends.

S6: The PC displays the navigation bar.

S5 and S6 may be simultaneously performed, that is, the PC simultaneously displays the first window and the navigation bar. Alternatively, the PC may first display the first window, and then display the navigation bar through an input operation, where the input operation may be received on the mobile phone, or may be received on the PC. The mobile phone is used as an example. When the mobile phone detects a click operation on a navigation bar deliver button on the mobile phone, the mobile phone indicates the PC to display the navigation bar. A display position of the navigation bar deliver button is not limited in this embodiment of this application.

A style of the navigation bar on the PC may be determined based on the navigation bar displayed on the mobile phone. For example, the style of the navigation bar on the PC is the same as that of the navigation bar displayed on the mobile phone. For example, the navigation bar displayed on the mobile phone includes three buttons: a button used to return to a home page, a button used to return to a previous step, and a button used to open a multi-task. In this case, the navigation bar on the PC may also include the three buttons. Alternatively, the navigation bar on the PC may be different from the navigation bar displayed on the mobile phone. For example, buttons are different. If the mobile phone still displays the three buttons, the navigation bar on the PC may not display the button used to open the multi-task, but display the button used to enter the next step or another button. This is not limited in this embodiment of this application.

There is a case in which the navigation bar may not be displayed on the mobile phone. For example, a function of the navigation bar on the mobile phone is replaced by a physical button or gesture navigation on the mobile phone. The gesture navigation is used as an example. In this case, a button on the navigation bar on the PC may be determined based on the gesture navigation that is set on the mobile phone. For the gesture navigation, refer to the foregoing noun explanation part. For example, if the mobile phone is set to slide up to return to a home page, slide right to return to a previous step, and slide left to enter a next step, the navigation bar on the PC includes a button used to return to a home page, a button used to return to a previous step, and a button used to enter a next step. In other words, an operation performed by the user on the button used to return to the previous step on the navigation bar on the PC may be mapped to a gesture operation of returning to a previous step on the mobile phone; and an operation performed by the user on the button used to return to the home screen on the navigation bar may be mapped to a gesture operation of returning to a home screen on the mobile phone. Usually, if the user sets the gesture navigation on the mobile phone, it indicates that the user may be accustomed to using the gesture operation. Therefore, in this manner, the user may implement, through the navigation bar on the PC, a function the same as that of the gesture operation on the mobile phone, and map the gesture operation on the mobile phone to the button on the PC, so that it is more convenient to perform an operation on the PC through a mouse. In consideration that a quantity of gesture operations that are set on the mobile phone may be large, a quantity of buttons on the navigation bar on the PC may be equal to the quantity of gesture operations that are set on the mobile phone. For example, a gesture operation is in a one-to-one correspondence with a button. Alternatively, the quantity of buttons on the navigation bar is limited, and a part of gesture operations may be mapped. The part of gesture operations may be any one or more gesture operations of all the gesture operations, or may be gesture operations used by the user with top N frequencies in all the gesture operations, where N is an upper limit of the quantity of buttons on the navigation bar.

For example, a function of the navigation bar on the mobile phone is replaced by a physical button for implementation. A button on the navigation bar on the PC may implement a function of the physical button on the mobile phone. For example, the physical button is a home button. Functions of the home button include returning to the home screen and opening the multi-task (for example, clicking the home button to return to the home screen, or double clicking the home button to open the multi-task). In this case, the navigation bar on the PC may include the button used to return to the home screen and the button used to open the multi-task. Therefore, in this manner, a problem that the physical button cannot be projected when the mobile phone performs projection onto the PC is resolved, and the user can implement, on the navigation bar on the PC, a function of operating the physical button on the mobile phone. This complies with a mobile phone operation habit of the user and improves interaction experience.

Certainly, the navigation bar on the PC may also have no relationship with the navigation bar, the physical button, or the gesture navigation on the mobile phone. In other words, the PC displays the navigation bar by default regardless of whether the mobile phone displays the navigation bar, the physical button, or the gesture navigation. The navigation bar may be a navigation bar that is preconfigured, or that is customized by the user on the PC.

S1 to S6 describe the process in which the PC displays the navigation bar when the mobile phone performs projection onto the PC. When the PC displays the navigation bar, the user may implement an operation on the first window through the navigation bar. For details, refer to S7 to S11.

S7: The PC detects a click operation performed by the user on a button on the navigation bar. The button on the navigation bar may be any button on the navigation bar. For example, the navigation bar includes a button used to return to a previous step, a button used to return to a home screen, and a button used to enter a next step. The button may be any one of the three buttons. The click operation may be a single-click operation or a double-click operation.

S8: The PC sends an operation instruction to the mobile phone.

Assuming that the click operation on the button used to return to the previous step on the navigation bar is detected in S7, the operation instruction sent by the PC to the mobile phone is to return to the previous step. Assuming that the click operation on the button used to return to the home screen on the navigation bar is detected in S7, the operation instruction sent by the PC to the mobile phone is to return to the home screen. Assuming that the click operation on the button used to open the multi-task on the navigation bar is detected in S7, the operation instruction sent by the PC to the mobile phone is to open the multi-task interface.

S9: The mobile phone displays a second interface in response to the operation instruction.

If the operation instruction is to return to the previous step, the second interface is a display interface displayed before the mobile phone displays the first interface; if the operation instruction is to return to the home screen, the second interface is the home screen; or if the operation instruction is to open the multi-task, the second interface is the multi-task interface.

S10: The mobile phone sends a second video stream to the PC through the first channel, where the second video stream includes information about the second interface.

For descriptions of the second video stream, refer to the descriptions of the first video stream in S4. Details are not described herein again.

S11: The PC displays the second interface in the first window.

In S7 to S11, the user may control the mobile phone by clicking the button on the navigation bar, so that the displayed content on the mobile phone is refreshed, and the displayed content on the PC is synchronously refreshed.

In S1 to S11, an example in which the PC displays projected content of the mobile phone in one window is used. The PC may further display the projected content of the mobile phone in a plurality of windows. The multi-window display manner may be implemented by performing S12 to S17.

S12: The PC detects a window separation operation.

The window separation operation may be a click operation on a window separation button "+" in the first window. A display position of the button "+" is not limited. For example, the button "+" may be displayed on the navigation bar, or may be displayed on a title bar above the window or an operation bar below the window. The window separation operation is used to separately display an interface currently displayed in the first window and a previous interface. For example, before S12, the first window is refreshed from the first interface to the second interface. In this case, the window separation operation is used to separately display the second interface and the first interface. Alternatively, the window separation operation is used to separately display an application to which a currently displayed interface of the first window belongs and a previously displayed application. Assuming that the currently displayed interface is an interface of an application 1, and an application recently displayed before the application 1 is an application 2, the application 1 and the application 2 are separately displayed. An example in which the window separation operation is used to separate a current interface from a previous interface is used below for description.

S13: The PC sends a window separation instruction to the mobile phone.

If the window separation operation is used to separate the current interface from the previous interface, the window separation instruction may be used to instruct the mobile phone to simultaneously send a video stream of the current interface and a video stream of the previous interface to the PC. If the window separation operation is used to separate the application to which the current interface belongs and the previously displayed application, the window separation instruction may be used to instruct the mobile phone to simultaneously send a video stream of the current application and a video stream of the previous application to the PC.

S14: The mobile phone establishes a second channel with the PC.

The second channel is a channel other than the first channel in the plurality of channels established between the mobile phone and the PC, and the second channel and the first channel correspond to different transmission bandwidths.

S15: The mobile phone respectively sends the information about the first interface and the information about the second interface through the first channel and the second channel. Specifically, S15 includes S15a and S15b. In S15a, the mobile phone transmits the second video stream on the second channel, where the second video stream includes the information about the second interface. In S15b, the mobile phone transmits the first video stream on the first channel, where the first video stream includes the information about the first interface.

S16: The PC displays a second window, where the second interface is displayed in the second window.

S17: Display the first interface in the first window.

In S12 and S17, an example in which the first interface and the second interface are displayed in separate windows by performing a window separation operation after the first interface in the first window is refreshed to the second interface is used. Alternatively, a manner of displaying the first interface and the second interface in separate windows may be as follows: When a click operation on a button on the navigation bar is detected in S7, the second interface and the first interface are automatically displayed in separate windows. For example, when the first window displays the first interface, the user clicks the button used to return to the previous step on the navigation bar, the PC automatically displays the second window, the second window displays the previous interface (namely, the second interface), and the first window displays the current interface (namely, the first interface). In this manner, S9 to S14 may not need to be performed, that is, S15 to S17 may be directly performed after S8 is performed.

If a new interface in a window covers an old interface, and then a manner of displaying the old and new interfaces in separate windows by performing a window separation operation is used as a first window separation manner, a manner of implementing window separation display through a button on the navigation bar may be used as a second window separation manner. This application may further provide a third window separation manner. For example, the first window displays an old interface. Assuming that an operation of opening a new interface (not an operation on the navigation bar) is detected, the new interface and the old interface are automatically displayed in separate windows. The new interface and the old interface are a same application or different applications. For example, the old interface is the home screen, the operation of opening the new interface may be an operation of clicking an application icon on the home screen, and the new interface may be an application interface corresponding to the application icon.

It may be understood that a display screen of the mobile phone is small. Therefore, the new interface on the mobile phone usually completely covers the old interface. When the user performs an operation on the mobile phone, if information of different interfaces needs to be viewed, the interfaces need to be continuously switched on the display screen. Therefore, when the mobile phone performs projection onto the PC, the PC displays the projected content of the mobile phone in a plurality of windows, so that the user can simultaneously view content of different interfaces on the mobile phone, and interaction experience is good.

Optionally, the second window is used as a secondary window of the first window, and another window may continue to be separated, or a window separation function may not be set for the secondary window. For example, a window separation button "+" is set in the first window, and a window separation button "+" may not be set in the second window. The first window may also be referred to as a primary window. Therefore, the user may distinguish between the primary window and the secondary window through the window separation button "+"; or may distinguish between the primary window and the secondary window in another manner. For example, a primary window mark is displayed on a title bar in the primary window, and the mark is not displayed or a mark of the secondary window is displayed on a title bar in the primary window.

This specification further provides a method for displaying a navigation bar on a PC when a mobile phone performs projection onto the PC. The following describes the method with reference to specific embodiments.

Embodiment 1

Figure 3A:
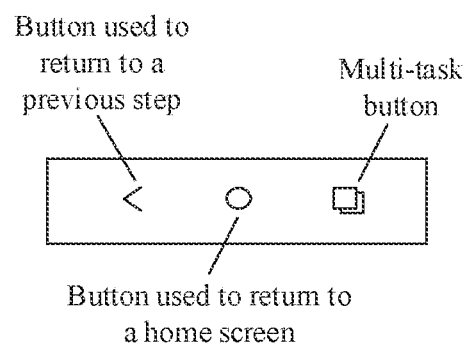
FIG. 3A is a schematic diagram of a first type of navigation bar on a PC according to an embodiment of this application.

FIG. 3A is a schematic diagram of a form of a navigation bar on a PC. The navigation bar includes three buttons: a button used to return to a previous step, a button used to return to a home screen, and a button used to open a multi-task. In FIG. 3A, a sequence of the three buttons from left to right is sequentially the button used to return to the previous step, the button used to return to the home screen, and the button used to open the multi-task. It may be understood that a display sequence of the three buttons is not limited in this embodiment.

Figure 3B:
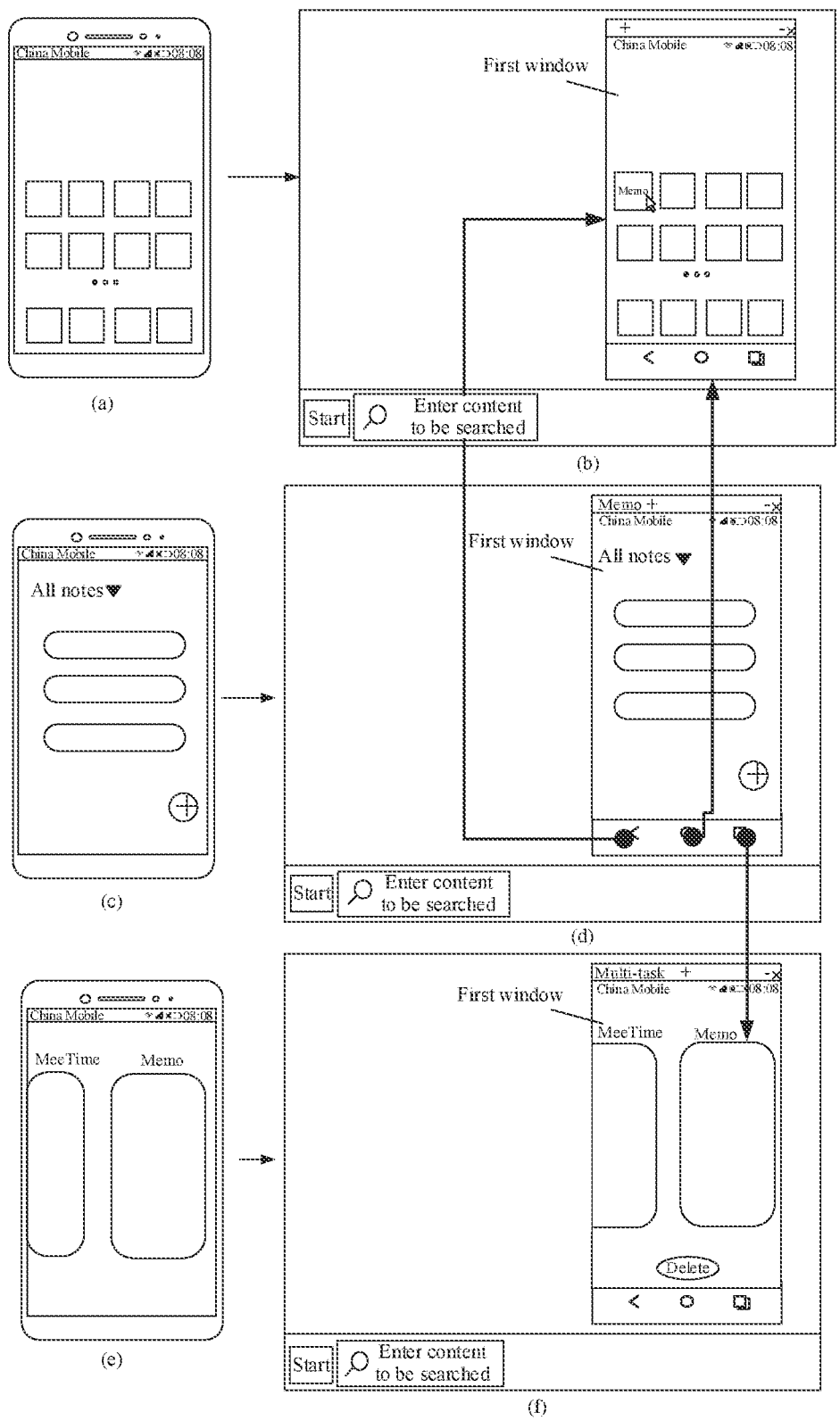
FIG. 3B is a schematic diagram of an example of operating a mobile phone through a first type of navigation bar according to an embodiment of this application.

For example, refer to (a) in FIG. 3B. A mobile phone displays the home screen. When the mobile phone performs projection onto a PC, the PC displays a first window, and the home screen is displayed in the first window. Refer to (b) in FIG. 3B. The home screen includes an icon of a memo application. If the PC detects an operation on the memo icon, the PC sends, to the mobile phone, an operation instruction used to instruct to open the memo, and the mobile phone displays a memo interface. Refer to (c) in FIG. 3B. The mobile phone may record a change of the display interface with time. For example, refer to Table 1:

TABLE 1

| Moment | Interface |
|---|---|
| First moment | Home screen |
| Second moment (after the first moment) | Memo interface |

The mobile phone projects the memo interface onto the PC, and the first window on the PC displays the memo interface. Refer to (d) in FIG. 3B.

Still refer to (d) in FIG. 3B. If the PC detects an operation of the button used to return to the previous step on a navigation bar, the PC sends an operation instruction for returning to the previous step to the mobile phone. The mobile phone may determine, according to Table 1, that a previous interface of the memo interface is the home screen, return to the home screen, and then perform projection onto the PC. Therefore, in the first window, the memo interface returns to the home screen. Therefore, the button used to return to the previous step in (d) in FIG. 3B points to an interface shown in (b) in FIG. 3B. This indicates that when the button used to return to the previous step is clicked, the first window returns from the memo interface to the previous interface, namely, the home screen.

Still refer to (d) in FIG. 3B, if the PC detects an operation on the button used to return to the home screen, the PC sends, to the mobile phone, an operation instruction for returning to the home screen, and the mobile phone returns to the home screen from the memo interface, and then performs projection onto the PC. Therefore, in the first window, the memo interface returns to the home screen. Therefore, the button used to return to the home screen in (d) in FIG. 3B points to an interface shown in (b) in FIG. 3B. This indicates that the first window returns from the memo interface to the home screen when the button used to return to the home screen is clicked.

Still refer to (d) in FIG. 3B. If the PC detects an operation on the multi-task button, the PC sends, to the mobile phone, an operation instruction for opening a multi-task interface, and the mobile phone opens the multi-task interface. Refer to (e) in FIG. 3B. Then, the mobile phone performs projection onto the PC. Therefore, in the first window, the memo interface is switched to the multi-task interface. Therefore, the multi-task button in (d) in FIG. 3B points to an interface shown in (f) in FIG. 3B. This indicates that the first window is switched from the memo interface to the multi-task interface when the multi-task button is clicked.

The navigation bar on the PC may be displayed in a plurality of manners, for example, at least one of the following manners:

Manner 1: Display on an operation bar below the window.

Figure 3C:
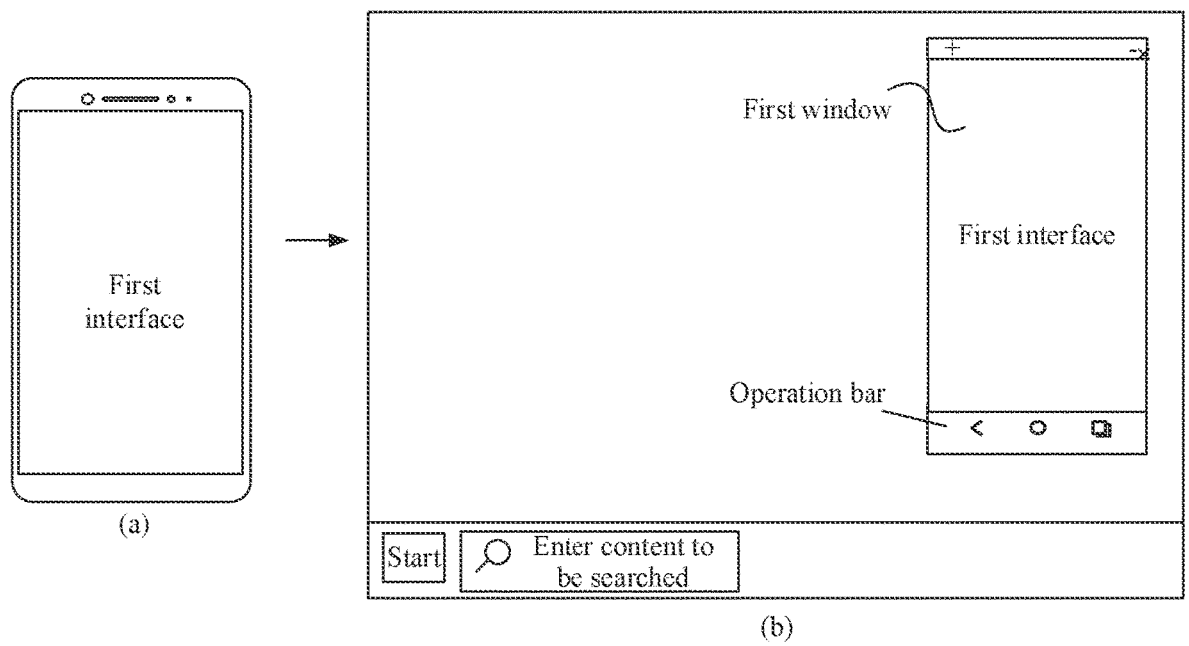
FIG. 3C is a schematic diagram of the first example of a first navigation bar display manner according to an embodiment of this application.

Refer to FIG. 3C. When the mobile phone performs projection onto the PC, the PC displays the first window, and the navigation bar is displayed on the operation bar below the first window. Usually, the navigation bar on the mobile phone is displayed below a display screen of the mobile phone. Therefore, displaying the navigation bar on the PC below the window in Manner 1 complies with an operation habit of the user on the mobile phone. In addition, usually, information about the window (for example, a name of a word) is displayed on a title bar above a window in a local window of the PC. If the navigation bar is displayed below a window projected from the mobile phone, it may be convenient for the user to distinguish specific windows that are projected from the mobile phone and specific windows that are PC local windows.

Manner 2: Display on a title bar above the window.

Figure 3D:
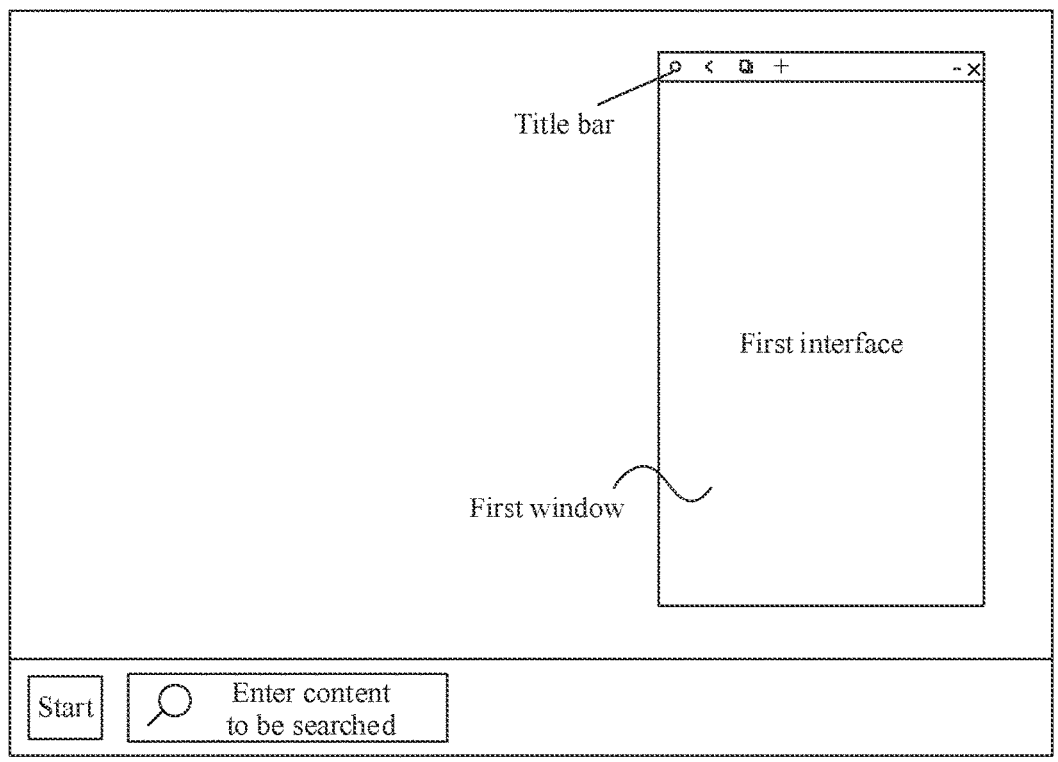
FIG. 3D is a schematic diagram of the second example of a first navigation bar display manner according to an embodiment of this application.

Refer to FIG. 3D. When the mobile phone performs projection onto the PC, the PC displays the first window, and the navigation bar is displayed on the title bar above the first window. Usually, when a window (referred to as a local window below) of a local application of the PC is displayed, information about the window (for example, a name of a word) is usually displayed on the title bar above the window. Therefore, in Manner 2, the navigation bar is displayed on the title bar above a window projected by the mobile phone, and a display style of the navigation bar may conform with that of the PC window. This better complies with an operation habit on the PC.

Manner 3: Display on a taskbar on the PC.

Figure 3E:
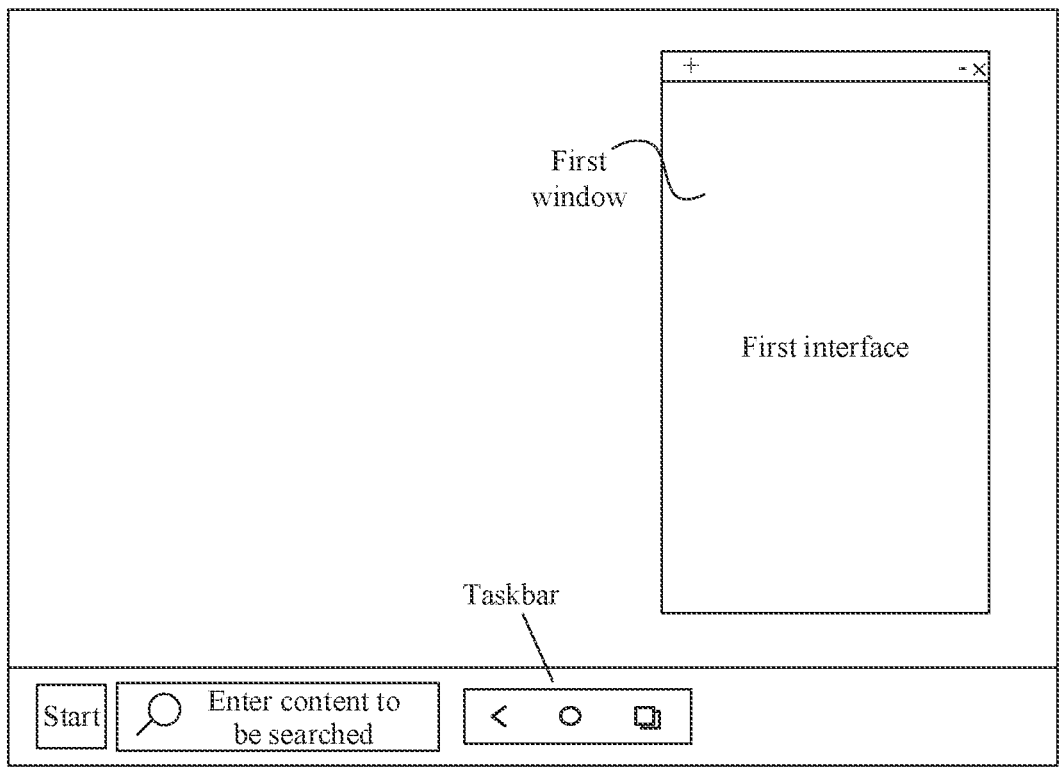
FIG. 3E is a schematic diagram of the third example of a first navigation bar display manner according to an embodiment of this application.

For a specific position of the taskbar, refer to FIG. 3E. The navigation bar may be displayed on the taskbar. In Manner 1 and Manner 2, the window and the navigation bar may be linked. For example, a position of the navigation bar changes with a position of the window, and an area of the navigation bar changes with an area of the window. A difference from Manner 1 and Manner 2 is that in Manner 3, the navigation bar is displayed independently of the window. Usually, the taskbar is disposed in an area below the display screen of the PC, and a position is usually fixed. Therefore, the user may view the navigation bar at the fixed position, and this is easy to remember. In addition, the taskbar of the PC usually includes an icon of a local application of the PC.

Therefore, when the navigation bar is displayed on the taskbar, this more complies with an operation habit on the PC.

Manner 4: Display on a display screen of the PC in a hovering manner.

Figure 3F:
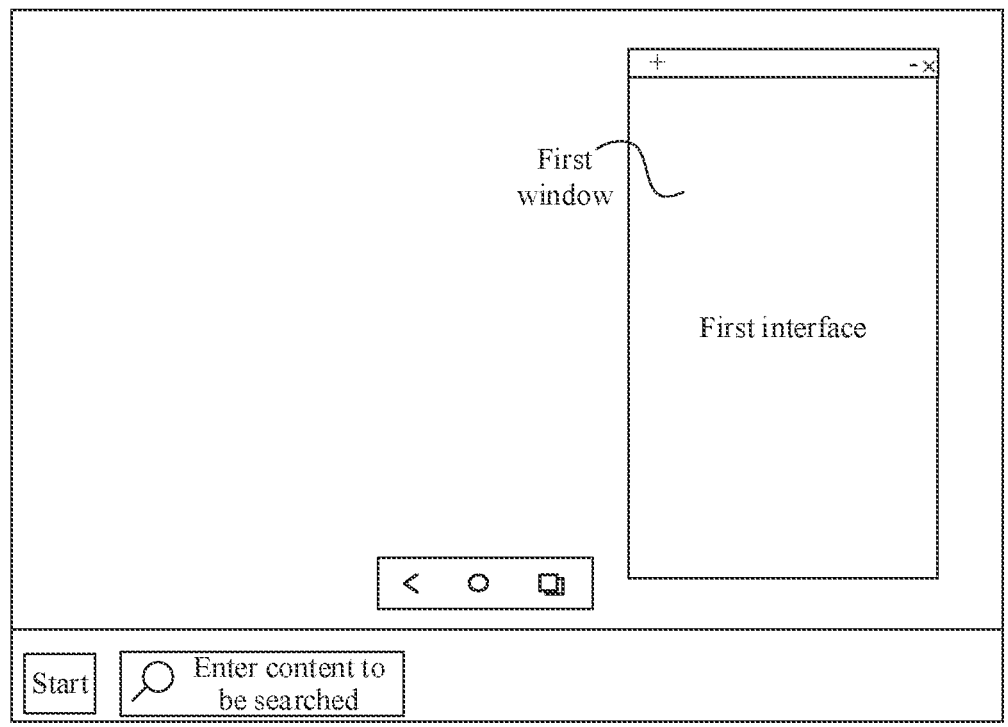
FIG. 3F is a schematic diagram of the fourth example of a first navigation bar display manner according to an embodiment of this application.

Refer to FIG. 3F. The taskbar is displayed in a hovering manner, and the navigation bar is displayed in a hovering manner. The hovering display may be understood as that the navigation bar is displayed at an uppermost layer of the display screen. Certainly, to avoid blocking displayed content at a lower layer, the navigation bar may be displayed in a transparent or translucent manner. It should be noted that the navigation bar in the accompanying drawings in this specification is grayscale for ease of reading by a reader, and this is not a limitation on a color of the navigation bar. In Manner 4, the navigation bar and the window are independent of each other, the position of the navigation bar may change, and the user may move the position based on a requirement of the user, to facilitate an operation.

The four navigation bar display manners shown in FIG. 3C to FIG. 3F may be used separately, or two or more of the four navigation bar display manners may be used in combination. Using a combination of Manner 1 and Manner 2 as an example, the navigation bar (namely, the navigation bar shown in FIG. 3A) is displayed on both the operation bar and the title bar.

In FIG. 3C to FIG. 3F, an example in which three buttons on the navigation bar are displayed together on the operation bar, the title bar, the taskbar, or the hovering display is used. It may be understood that the three buttons may also be separately displayed at different positions. For example, the button used to return to the previous step is displayed on the title bar, the button used to return to the home screen is displayed on the operation bar, and the button used to open the multi-task is displayed on the taskbar. Alternatively, every two of the three buttons are displayed together at one position, the other button is displayed at another position, and so on. This is not limited in this embodiment of this application.

Embodiment 2

Figure 4A:
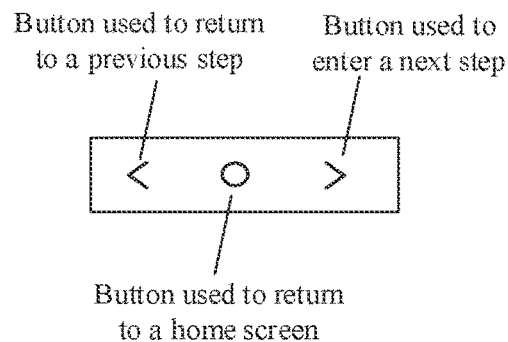
FIG. 4A is a schematic diagram of a second type of navigation bar on a PC according to an embodiment of this application.

Embodiment 1 provides a form of the navigation bar, namely, the navigation bar shown in FIG. 3A. Embodiment 2 provides another form of a navigation bar. FIG. 4A is a schematic diagram of the another form of the navigation bar. A difference from the form of the navigation bar provided in Embodiment 1 is that the navigation bar shown in FIG. 4A does not include a button used to open a multi-task, but includes a button used to enter a next step. If the navigation bar provided in Embodiment 1 is used as a first type navigation bar, the navigation bar provided in Embodiment 2 may be used as a second type of navigation bar. The first type of navigation bar has been described in Embodiment 1, and the following describes the second type of navigation bar with reference to an example.

Figure 4B:
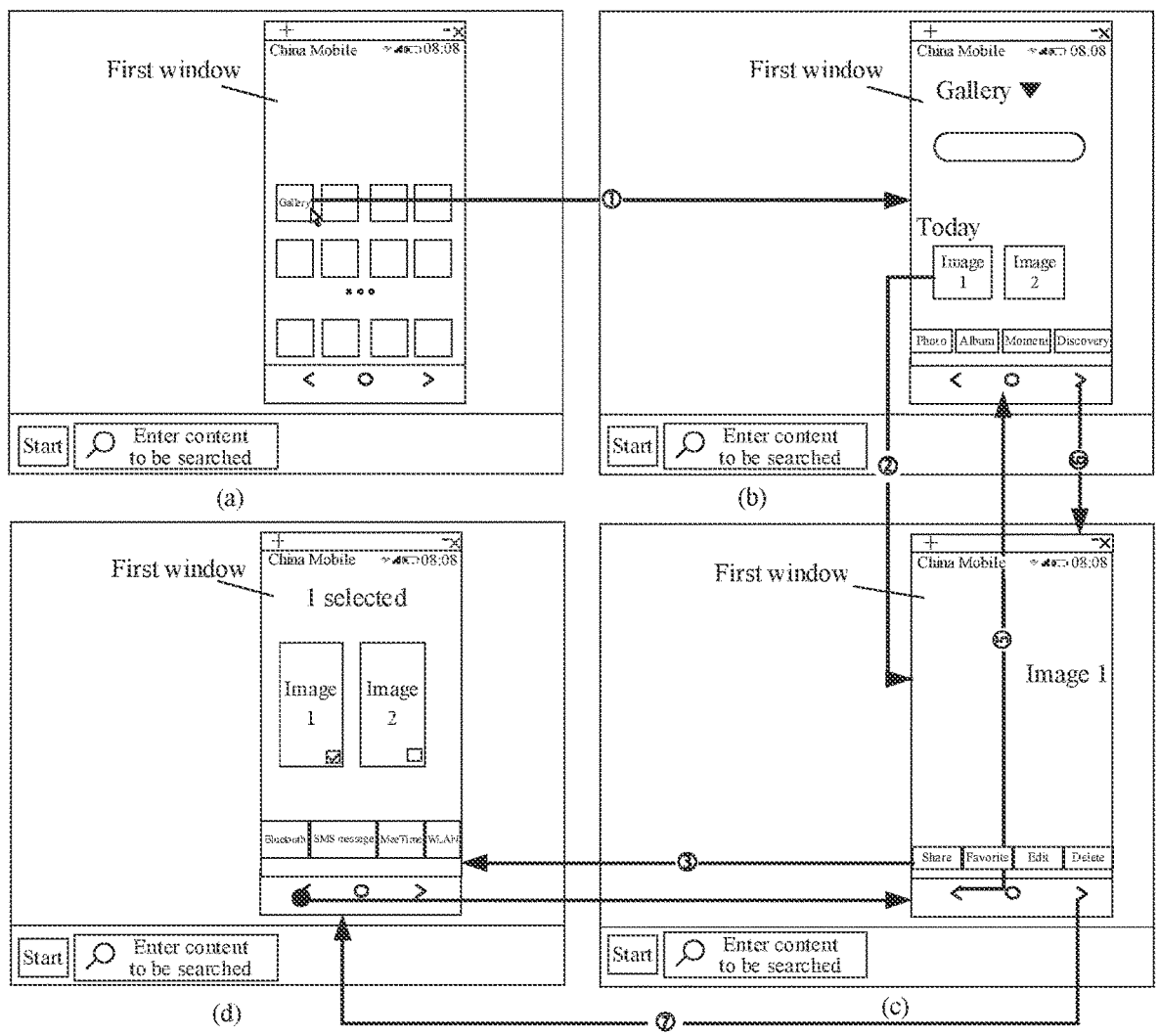
FIG. 4B is a schematic diagram of an example of operating a mobile phone through a second type of navigation bar according to an embodiment of this application.

Refer to FIG. 4B. For ease of understanding, (1) and (2) are used in FIG. 4B to mark an operation procedure.

(1) Refer to (a) in FIG. 4B. A PC displays a first window, the first window displays a home screen, and when detecting an operation on a gallery application icon on the home screen, displays a gallery interface in the first window in response to the operation. Refer to (b) in FIG. 4B.

(2) Refer to (b) in FIG. 4B. The gallery interface is displayed in the first window, including a thumbnail of an image 1 and a thumbnail of an image 2. When an operation on the thumbnail of the image 1 is detected, an operation interface of the image 1 is displayed in the first window in response to the operation. Refer to (c) in FIG. 4B. Some controls such as "Share", "Favorite", and "Delete" may be further displayed.

(3) Refer to (c) in FIG. 4B. The first window displays the operation interface of the image 1, including a "share" control. When an operation on the "Share" control is detected, a sharing interface is displayed in response to the operation. Refer to (d) in FIG. 4B. The user may select, on the sharing interface, an image to be shared and a sharing manner, for example, Bluetooth, a short message service message, or MeeTime.

In the foregoing process (1) to (3), a change process from the home screen→the gallery interface→the operation interface of the image 1→the sharing interface is implemented. The PC can record a change of the interface with time. For example, refer to Table 2:

TABLE 2

The interface changes with time, and the time increases from top to bottom

| Moment | Interface |
| --- | --- |
| T1 | Home screen |
| T2 | Gallery interface |
| T3 | Operation interface of the image 1 |
| T4 | Sharing interface |

It may be understood that if another interface is further displayed before (1) and/or after (3), and the interface may also be recorded.

The following describes processes of returning to a previous step and entering a next step. For the process of returning to the previous step, refer to (4) and/or (5) in FIG. 4B. For the process of entering the next step, refer to (6) and/or (7) in FIG. 4B.

(4) Refer to (d) in FIG. 4B. The sharing interface is displayed in the first window, an operation on a button used to return to the previous step on the navigation bar is detected, and the previous interface of the sharing interface is returned in response to the operation. According to Table 2, it may be determined that the previous interface of the sharing interface is the operation interface of the image 1. Therefore, the operation interface of the image 1 is displayed in the first window. Refer to (c) in FIG. 4B.

(5) If the operation on the button used to return to the previous step on the navigation bar is detected again, continue to return to the previous interface, namely, the gallery interface. Refer to (b) in FIG. 4B.

(6) Refer to (b) in FIG. 4B. If an operation on a button used to enter the next step on the navigation bar is detected, a next interface is displayed in response to the operation. According to Table 2, it may be determined that the next interface is the operation interface of the image 1. Therefore, the operation interface of the image 1 is displayed in the first window. Refer to (c) in FIG. 4B.

(7) If an operation on a button used to enter the next step on the navigation bar is detected again, the next interface, namely, the sharing interface, is displayed in response to the operation. Refer to (d) in FIG. 4B.

Figure 4C:
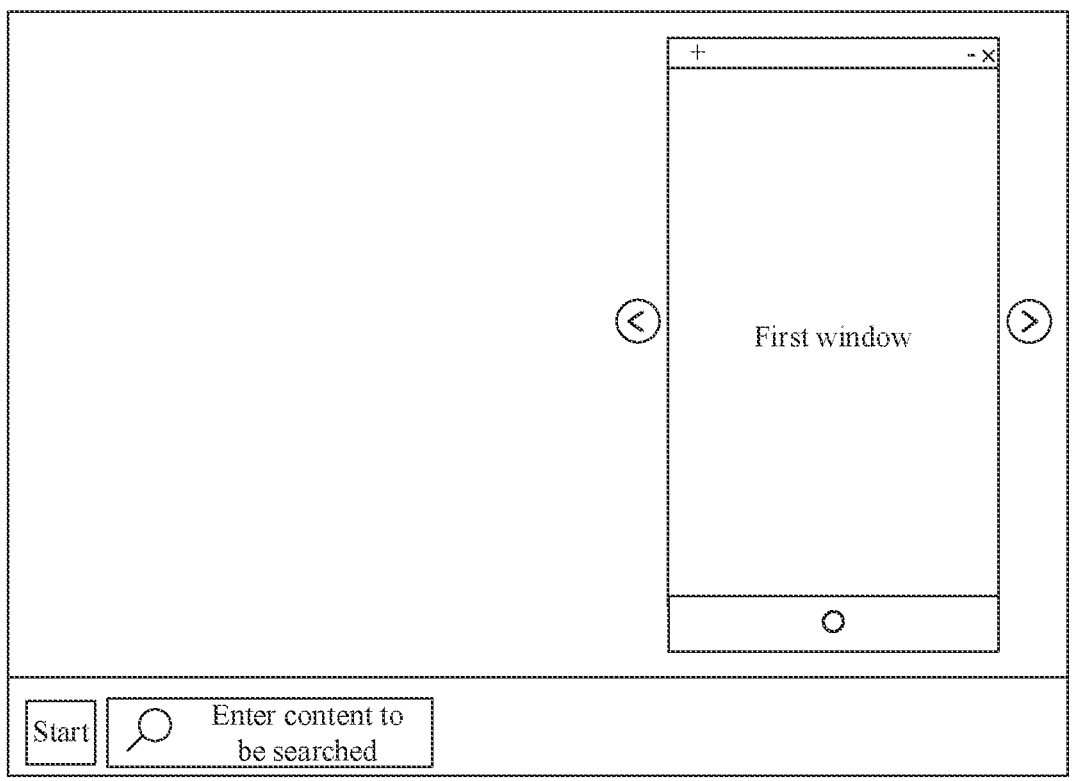
FIG. 4C is a schematic diagram of another example of operating a mobile phone through a second type of navigation bar according to an embodiment of this application.

The second type of navigation bar may be displayed in a plurality of manners, for example, at least one of Manner 1 to Manner 4 provided in Embodiment 1. For details, refer to the descriptions in Embodiment 1. In addition, the three buttons on the second type of navigation bar may be displayed in one position (for example, an operation bar and a title bar), or may be split and separately displayed in different positions. For example, an appropriate position may be selected for display based on different buttons on the navigation bar. For example, refer to FIG. 4C. The button used to return to the previous step is displayed on the left side of the window, the button used to enter the next step is displayed on the right side of the window, and the button used to return to the home screen is displayed on the operation bar. In this manner, a display effect similar to page turning may be presented to the user, and interaction experience is better.

The PC may use either of the two navigation bars by default, or a navigation bar switch button is set on the PC, and the user may switch between the two navigation bars through the button. Alternatively, whether to use the first type of navigation bar or the second type of navigation bar is determined based on a style of the navigation bar on the display screen of the mobile phone, or whether to use the first type of navigation bar or the second type of navigation bar is determined based on gesture navigation that is set on the mobile phone. For example, the gesture navigation that is set on the mobile phone includes returning to the previous step, returning to the home screen, and opening the multi-task, but does not include entering the next step. In this case, the PC uses the first type of navigation bar. Alternatively, the gesture navigation that is set on the mobile phone includes returning to the previous step, returning to the home screen, and entering the next step, but does not include opening the multi-task. In this case, the PC uses the second type of navigation bar. However, there is a case in which the user sets, on the mobile phone, not only returning to the previous step, returning to the home screen, opening the multi-task, but also entering the next step. This indicates that the four functions may all be frequently used by the user. Therefore, it is better to display four buttons on the PC. Therefore, the first type of navigation bar and the second type of navigation bar may be combined. In consideration that a display area of the operation bar, the title bar, or the like of the window is limited, if the four buttons are accommodated, the buttons are dense and are prone to an unintentional touch. Therefore, at least one of the four buttons needs to be displayed separately from another button. For example, the PC displays the second type of navigation bar on the operation bar below the window. Because the second type of navigation bar does not have a multi-task button, the multi-task button may be displayed on the taskbar. For details, refer to (a) in FIG. 5.

When the button used to open the multi-task is displayed on the taskbar, as shown in (f) in FIG. 3B, a multi-task interface is opened in the first window when an operation (an operation in which a mouse arrow is hovered over on the multi-task button or an operation in which the multi-task button is clicked) for the multi-task button on the taskbar is detected. Alternatively, the display method shown in (a) in FIG. 5 may be used. As shown in (a) in FIG. 5, when the operation on the multi-task button on the taskbar is detected, the multi-task interface is not displayed in the first window, but a multi-task box is displayed on the taskbar (or the multi-task box may be undisplayed). The multi-task box includes three interface identifiers, which are respectively A1 to A3, and the interface identifiers may be scaled-down versions of interfaces. The three interface identifiers may be, for example, identifiers of interfaces of applications currently running on the mobile phone. When the PC detects an operation on the interface identifier A2 in the multi-task box, the interface A2 is displayed in the first window. Refer to (b) in FIG. 5. Certainly, if a new interface such as an interface A4 is opened in the first window, an interface identifier A4 may be added to the multi-task box. Refer to (c) in FIG. 5.

Figure 5:
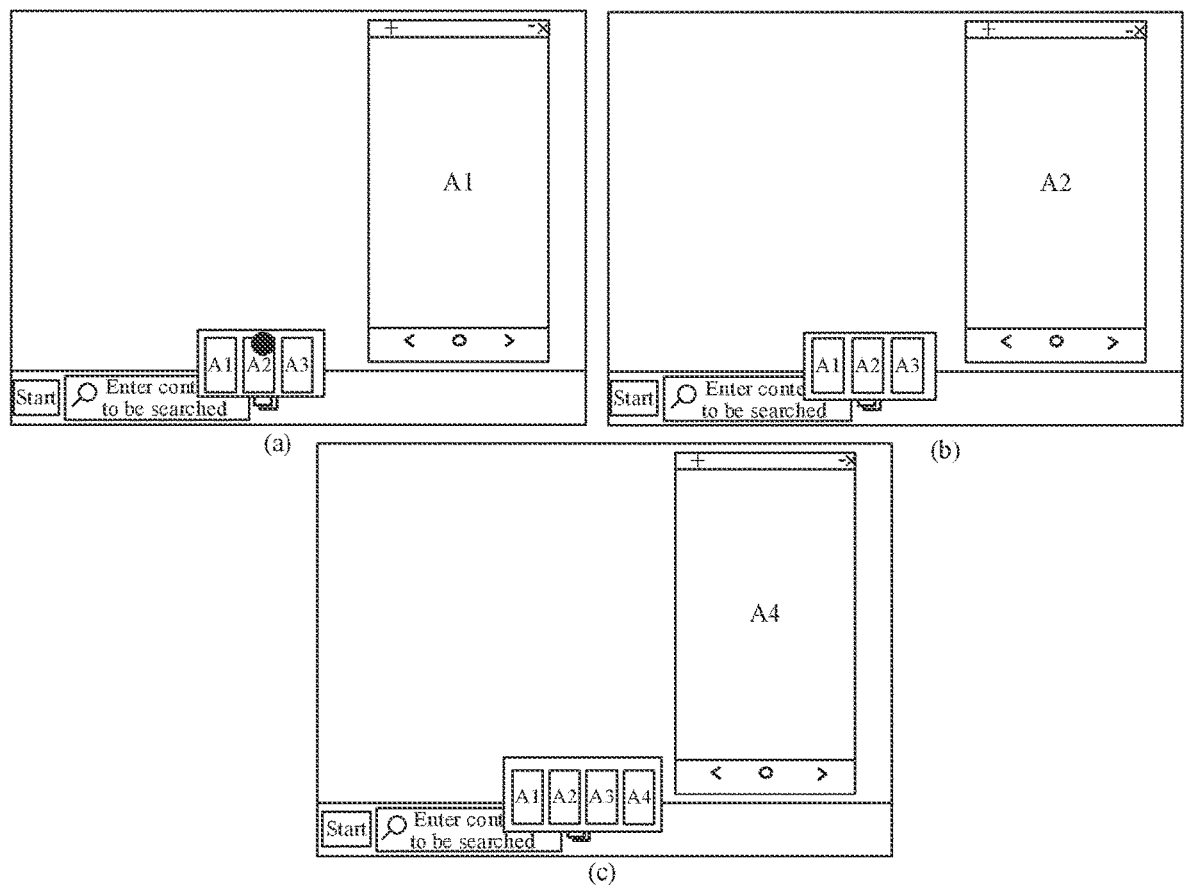
FIG. 5 is a schematic diagram of an example in which two navigation bars are displayed in combination according to an embodiment of this application.

In (a) in FIG. 5, that A1 to A3 included in the multi-task box are identifiers of interfaces of applications running on the mobile phone is used as an example. It may be understood that A1 to A3 may alternatively be identifiers of applications set by the user, or identifiers of applications commonly used by the user are collected through statistics by the mobile phone. This is not limited in this embodiment of this application.

Optionally, the PC may change a display position of the navigation bar in response to the operation of the user. Therefore, the user may adjust the display position of the navigation bar based on a requirement of the user, and interaction experience is good.

Figure 6A:
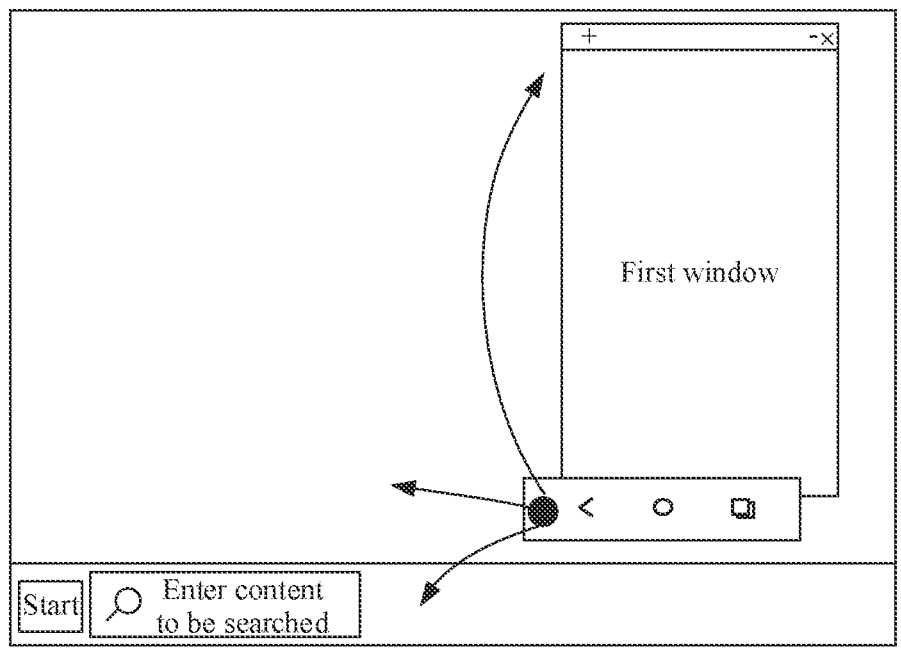
FIG. 6A to FIG. 6D are schematic diagrams of an example of adjusting a navigation bar display manner according to an embodiment of this application.

The first type of navigation bar is used as an example. Refer to FIG. 6A. It is assumed that the PC displays the navigation bar on the operation bar below the window by default. When the PC detects a hold and drag operation on a non-button area on the navigation bar, the navigation bar moves a position, for example, may move to a position such as the title bar or the taskbar. In FIG. 6A, the first type of navigation bar is used as an example. It may be understood that, for the second type of navigation bar, the display position of the second type of navigation bar may also change under a user operation.

In FIG. 6A, an example in which the navigation bar moves as a whole is used. It may be understood that the navigation bar includes a plurality of buttons, and each button may separately move a position. The first type of navigation bar is still used as an example. Refer to (a) in FIG. 6B. When the PC detects an operation of holding and dragging a multi-task button on the navigation bar, the multi-task button is separated from the navigation bar. Assuming that the multi-task button is dragged to the taskbar, a button used to enter a next step may be displayed at a position of an original multi-task button. Refer to (b) in FIG. 6B.

Figure 6B:
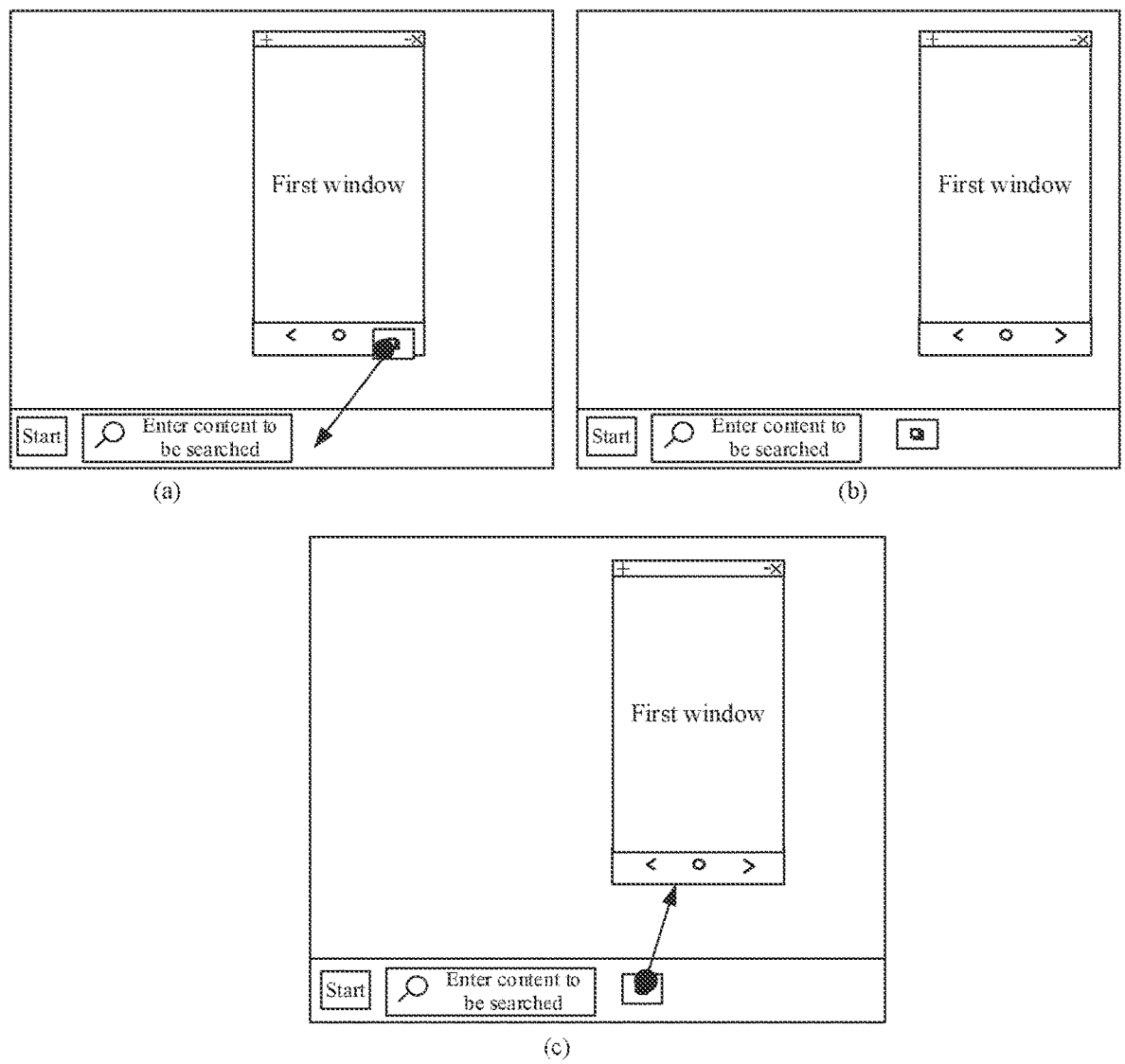

(a) in FIG. 6B and (b) in FIG. 6B are described by using an example in which the multi-task button is removed from the navigation bar. Certainly, the multi-task button may be further moved back to the navigation bar. Refer to (c) in FIG. 6B. In consideration of aesthetics of the interface, it is recommended that a width of the navigation bar is the same as that of the window. As a result, the display area of the navigation bar is limited. If the navigation bar accommodates a large quantity of buttons, it is prone to an unintentional touch on the navigation bar. Therefore, when moving the multi-task button back to the navigation bar, one button on the navigation bar may be replaced to remain the quantity of buttons on the navigation bar unchanged. The replaced button may be the button for the next step displayed at the position of the original multi-task button, or the multi-task button may replace another button on the navigation bar. For example, if the multi-task button is dragged from the taskbar to a position of the button used to return to the previous step, the multi-task button replaces the button used to return to the previous step.

In the example shown in FIG. 6A, after the button is removed from the navigation bar, a new button is displayed at a vacated position. The new button is different from the button originally displayed on the navigation bar, and may be a button in candidate buttons. That is, different from the button originally displayed on the navigation bar, the candidate buttons are hidden. When one button removes from the navigation bar, one of the candidate buttons is displayed at the vacated position on the navigation bar. Optionally, the PC may display the hidden candidate buttons in advance. In this way, the user may select a button to be removed from the candidate buttons and a button originally displayed on the navigation bar. For example, refer to (a) in FIG. 6C. When the PC detects a click, double-click, or touch-and-hold operation on the non-button area of the navigation bar, an originally hidden candidate button is also displayed on the navigation bar. As shown in (a) in FIG. 6C, there are three hidden candidate buttons, and there are six buttons in total in addition to the three buttons originally displayed on the navigation bar. The user may select a button to be removed from the six buttons. In (a) in FIG. 6C, an example in which there are three candidate buttons is used. During actual application, more or fewer candidate buttons may be included. The candidate buttons may be preset buttons, for example, preset buttons of the mobile phone before delivery, or customized by the user on the mobile phone. In (a) in FIG. 6C, an example in which the candidate buttons include a next-step button, a pull-up menu button, and a slide-down menu button is used. In (a) in FIG. 6C, because the first type of navigation bar is displayed below the window, the button used to enter the next step is used as a candidate button. It may be understood that if the first type of navigation bar is replaced with the second type of navigation bar, the multi-task button is used as the candidate button.

Certainly, after the candidate button is displayed, the candidate button may be further hidden again. For example, when the PC detects again a click, double-click, or touch-and-hold operation in the non-button area on the navigation bar, the candidate button is hidden.

Assuming that the PC detects a hold and drag operation on a slide-up menu button in the candidate buttons, a position of the slide-up menu button is moved. It is assumed that the slide-up menu button is moved to the taskbar, as shown in (b) in FIG. 6C. After one of the candidate buttons is removed, a remaining candidate button may be automatically hidden, or may not be temporarily hidden, and is hidden when a double-click or touch-and-hold operation on the navigation bar is detected.

The removed candidate button may further be moved back to the navigation bar. In consideration that a quantity of buttons on the navigation bar needs to remain unchanged, the candidate button may replace a specific button on the navigation bar, or the candidate button is automatically hidden when being moved back to the navigation bar, as shown in (c) in FIG. 6C.

Figure 6C:
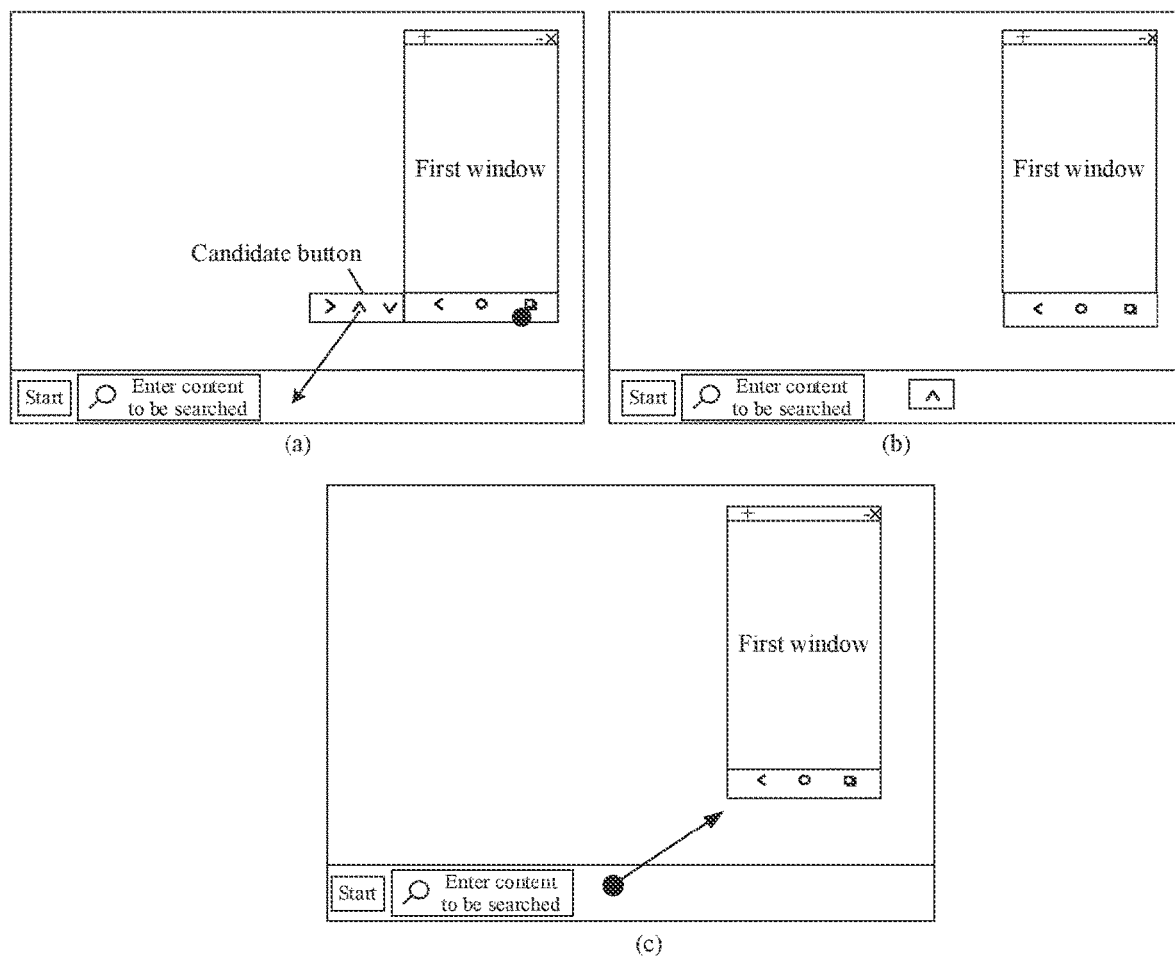
Figure 6D:
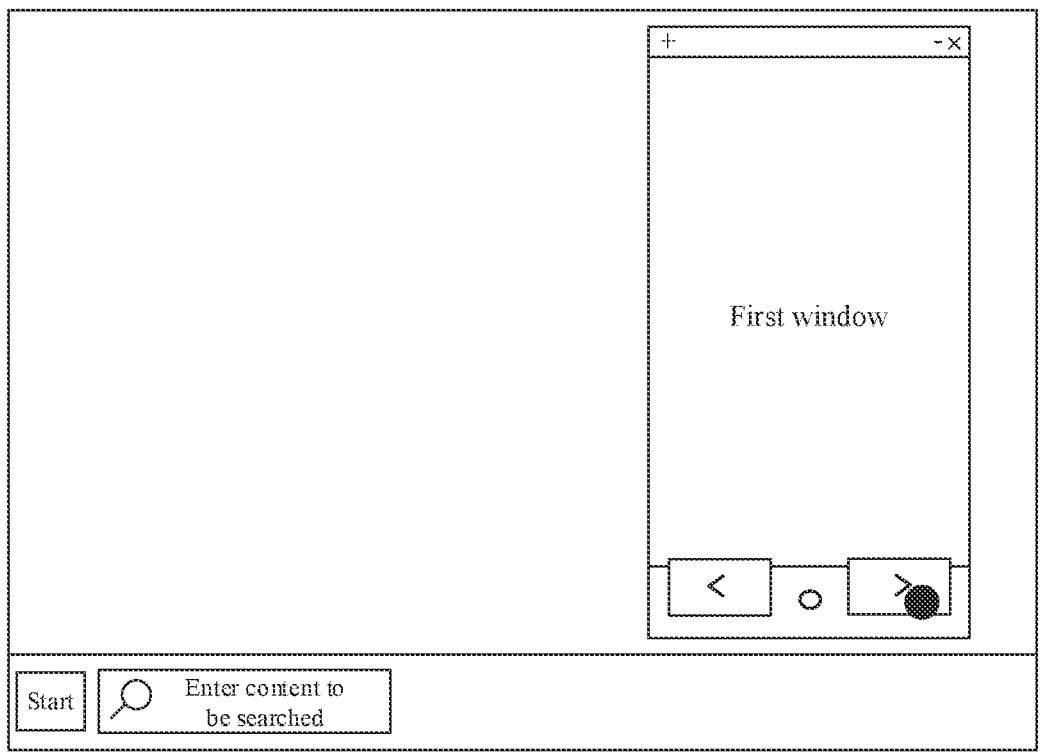
Figure 6D:
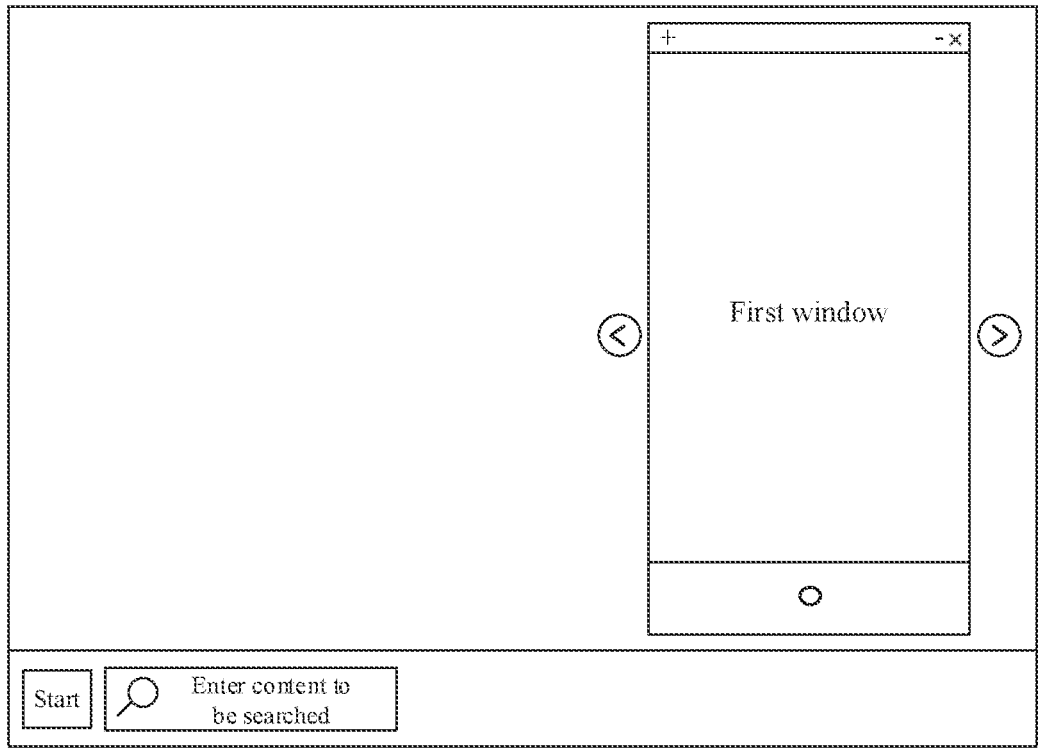

In the examples in FIG. 6A to FIG. 6C, an example in which one button is removed from the navigation bar is used. It may be understood that the plurality of buttons on the navigation bar may be removed together. For example, the second type of navigation bar is used as an example. Refer to (a) in FIG. 6D. When the PC detects a hold and drag operation on the button used to return to the previous step or the button used to enter the next step, the button used to return to the previous step and the button used to enter the next step are removed from the navigation bar together. Assuming that the button is moved to a left side of the window, the button used to return to the previous step is displayed on the left side of the window, and the button used to enter the next step is displayed on a right side of the window. In the examples in FIG. 6A to FIG. 6C, when the button on the navigation bar is removed, the vacated position is occupied by the candidate button. It may be understood that no candidate may be displayed at the vacated position. For example, refer to (b) in FIG. 6D. Only the button used to return to the home screen is displayed on the navigation bar.

In the foregoing embodiment, an example in which one or more buttons are removed from the navigation bar as a whole is used. It may be understood that, in some cases, one button on the navigation bar may have a plurality of functions, and the PC may separately remove, from the navigation bar, a part of functions of the button having the plurality of functions. For example, for some mobile phones, returning to the home screen and opening the multi-task are implemented through a same physical button such as a home button. For example, the home button is clicked to return to the home screen, and the home button is continuously double-clicked to open the multi-task. For this type of mobile phone, the user is more accustomed to returning to the home screen and opening the multi-task function through the physical button. Therefore, after the mobile phone performs projection onto the PC, if the second type of navigation bar is used, a button "○" has two functions: returning to the home screen and opening the multi-task. In this case, if the PC detects a hold and drag operation on the button "○", one function of the button may be removed. For example, the multi-task function is moved to the taskbar and displayed as a separate icon, and the button "○" is still displayed on the navigation bar, but the button "○" on the navigation bar has only a function of returning to the home screen. It may be understood that, on the mobile phone, the user needs to click the home button to return to the home screen, and touch-and-hold the home button to open the multi-task, which is complex. When the mobile phone performs projection onto the PC, the navigation bar on the PC separates the functions of returning to the home screen and opening the multi-task into different buttons for display. In this way, the user only needs to click the button used to return to the home screen or click the button for opening the multi-task, which simplifies a user operation.

FIG. 3A to FIG. 7 are described by using an example in which one window (for example, the first window) is displayed on the PC. It may be understood that the method for displaying the navigation bar on the PC provided in this specification is also applicable to a scenario in which projected content of the mobile phone is displayed in the plurality of windows on the PC. For a multi-window projection procedure, refer to the embodiment shown in FIG. 3C, for example, S12 to S17.

Figure 7A:
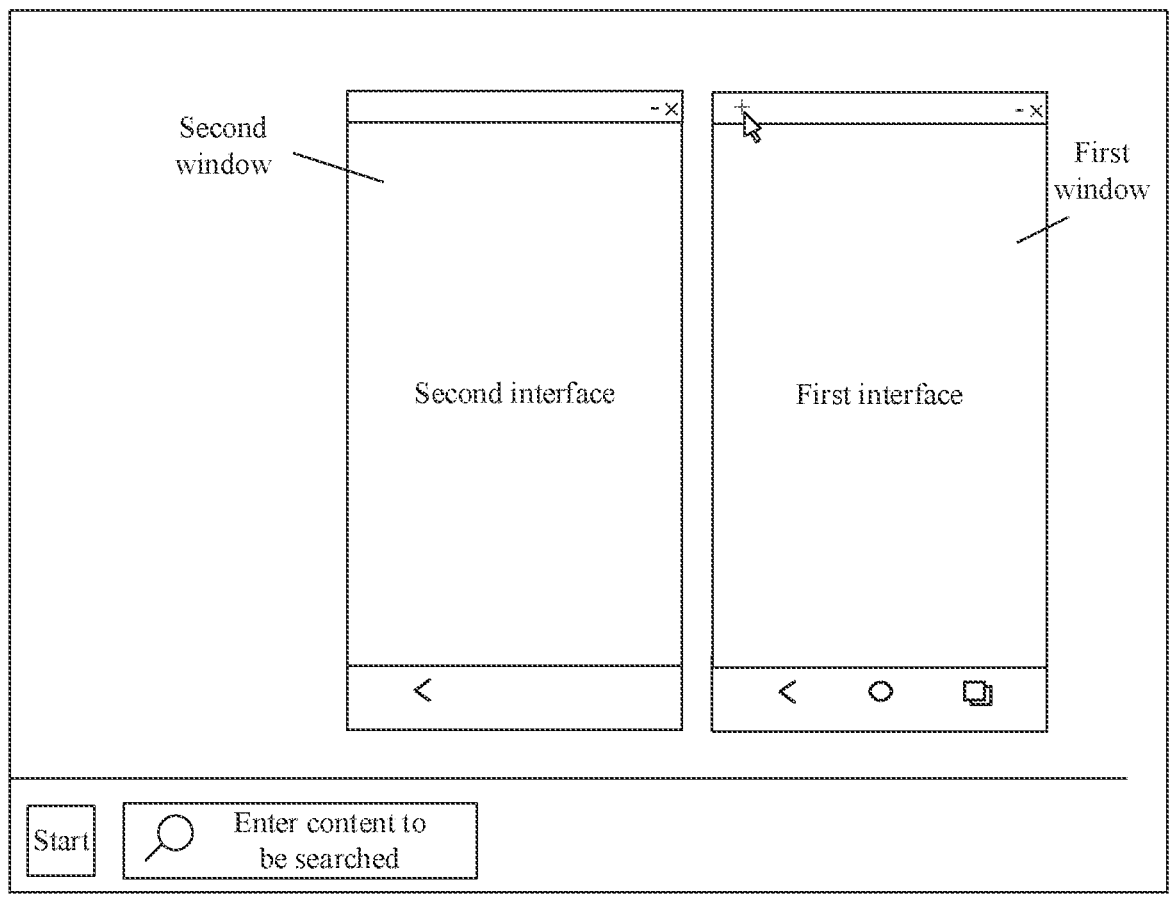
FIG. 7A is a schematic diagram of an example of a navigation bar display manner during multi-window display according to an embodiment of this application.

When two or more windows are displayed on the PC, a quantity of navigation bars may increase accordingly. For example, each window corresponds to one navigation bar. Refer to FIG. 7A. The first window corresponds to one navigation bar, and the second window corresponds to another navigation bar. Navigation bars corresponding to the two windows may be the same, where for example, both are the first type of navigation bar or both are the second type of navigation bar; or may be different. For example, the first window corresponds to the first type of navigation bar, and the second window corresponds to the second type of navigation bar. This is not limited in this embodiment of this application. A display position of the navigation bar corresponding to each window may use any one or more of Manner 1 to Manner 4 in Embodiment 1. In addition, the display position of the navigation bar corresponding to each window may be the same or different. For example, the navigation bar corresponding to the home screen is displayed on an operation bar of the home screen, and the navigation bar corresponding to a secondary window is displayed on a title bar of the secondary window. This convenient the user to distinguish between a primary window and the secondary window.

Optionally relative to a navigation bar of the primary window, a navigation bar of the secondary window may be slightly different. For example, refer to FIG. 7A. On the navigation bar corresponding to the second window, the button used to return to the home screen and the multi-task button may be grayed out. That is, a touch control function is disabled. That is, the secondary window does not have the function of returning to the home screen and the function of opening the multi-task; or the navigation bar of the secondary window may not display the button used to return to the home screen and the multi-task button.

Figure 7B:
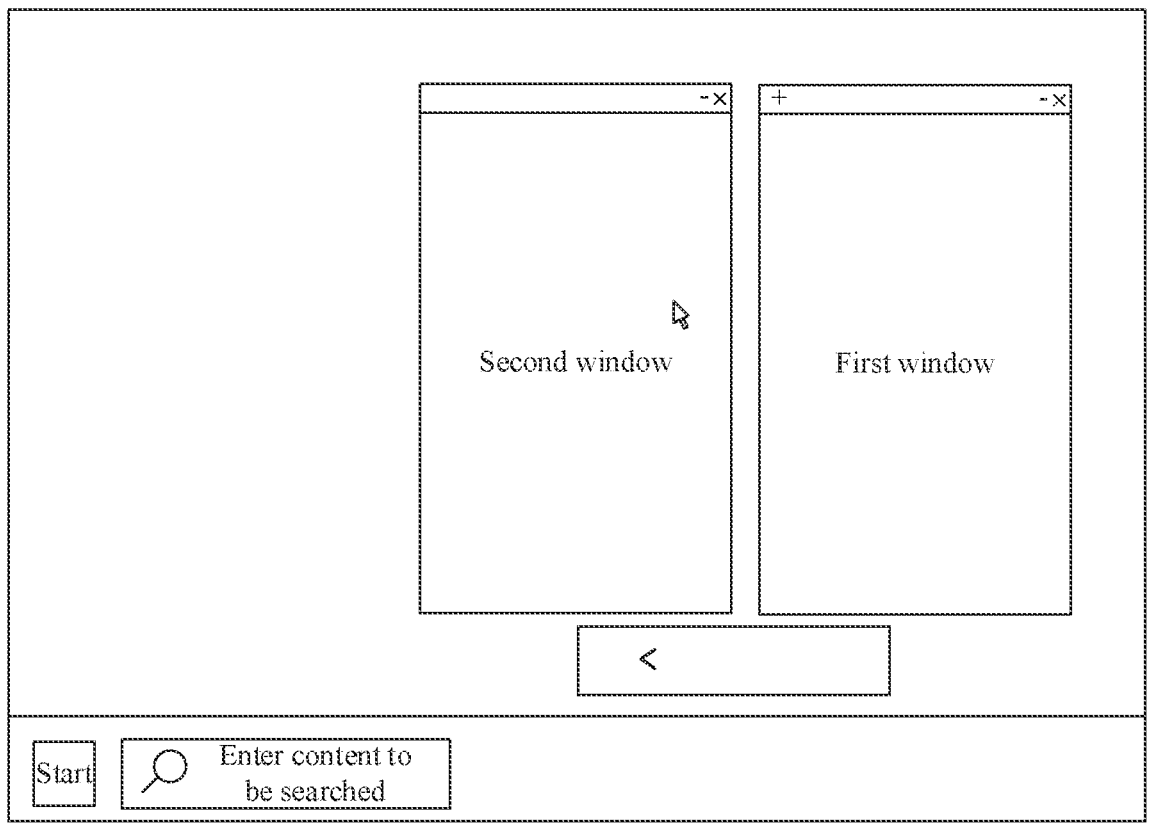
FIG. 7B is a schematic diagram of another example of a navigation bar display manner during multi-window display according to an embodiment of this application.

In consideration that there is a large quantity of windows, if each window corresponds to one navigation bar, there are a large quantity of navigation bars. Therefore, the plurality of windows on the PC may correspond to one navigation bar. For example, the first window and the second window share one navigation bar. Refer to FIG. 7B. When the first window is a focus window, the navigation bar is used to implement control on the first window. When the second window is a focus window, the navigation bar is used to implement control on the second window. In a case in which the plurality of windows correspond to one navigation bar, a display manner of the navigation bar may be any one or more of Manner 1 to Manner 4 in Embodiment 1. For example, refer to FIG. 7B. Navigation bars corresponding to the plurality of windows are displayed in a hovering manner (namely, Manner 4). During hovering display, the display position of the navigation bar may change under a user operation, which is flexible. For another example, the navigation bar corresponding to the plurality of windows may also be displayed in Manner 3, that is, the navigation bar shared by the plurality of windows is displayed on the taskbar of the PC, to avoid messy content displayed on the display screen. In addition, the position of the taskbar is fixed, and the user is more accustomed to viewing an icon on the taskbar on the PC. Therefore, displaying the navigation bar on the taskbar more complies with the operation habit of the user on the PC.

Optionally, if the secondary window does not have the functions of returning to the home screen and opening the multi-task, when the second window is the focus window, the button used to return to the home screen and the multi-task button on the navigation bar may be grayed out, and the touch control function is disabled. Refer to FIG. 7B. When the first window is the focus window, the navigation bar returns to normal. In other words, none of the three buttons is grayed out.

Figure 7C:
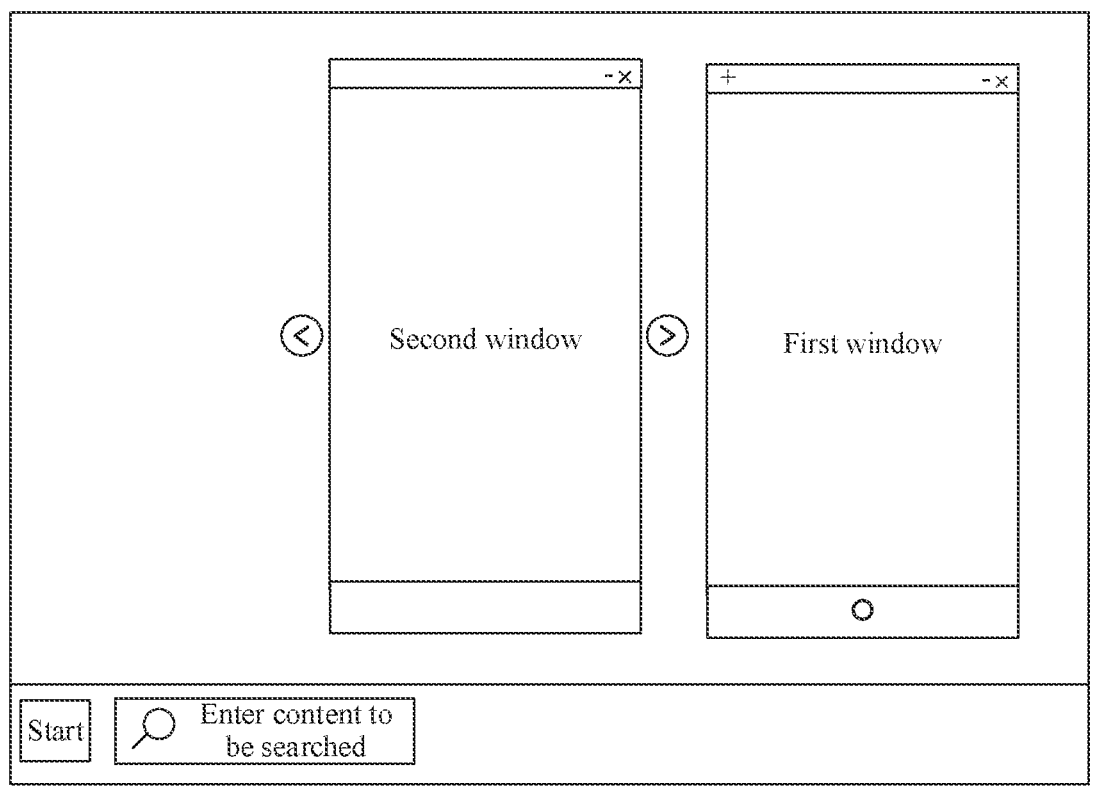
FIG. 7C is a schematic diagram of still another example of a navigation bar display manner during multi-window display according to an embodiment of this application.

In FIG. 7B, an example in which two windows share one navigation bar is used. It may be understood that the two windows may further share a part of buttons on the navigation bar. For example, the second type of navigation bar is used. Refer to FIG. 7C. The first window and the second window share the button used to return to the previous step and the button used to enter the next step, but do not share the button used to return to the home screen. When the second window is the focus window, the button used to return to the previous step and the button used to enter the next step are respectively displayed on the left and right sides of the second window. When the first window is the focus window, the button used to return to the previous step and the button used to enter the next step are respectively displayed on the left and right sides of the first window. In this manner, when there is a large quantity of windows, the user can quickly locate the current focus window through buttons on the left and right sides, and interaction experience is good. Optionally, if the secondary window does not have the function of returning to the home screen, the button used to return to the home screen corresponding to the second window may be grayed out, and the touch control function is disabled; or the button used to return to the home screen corresponding to the second window may be undisplayed.

Figure 8A:
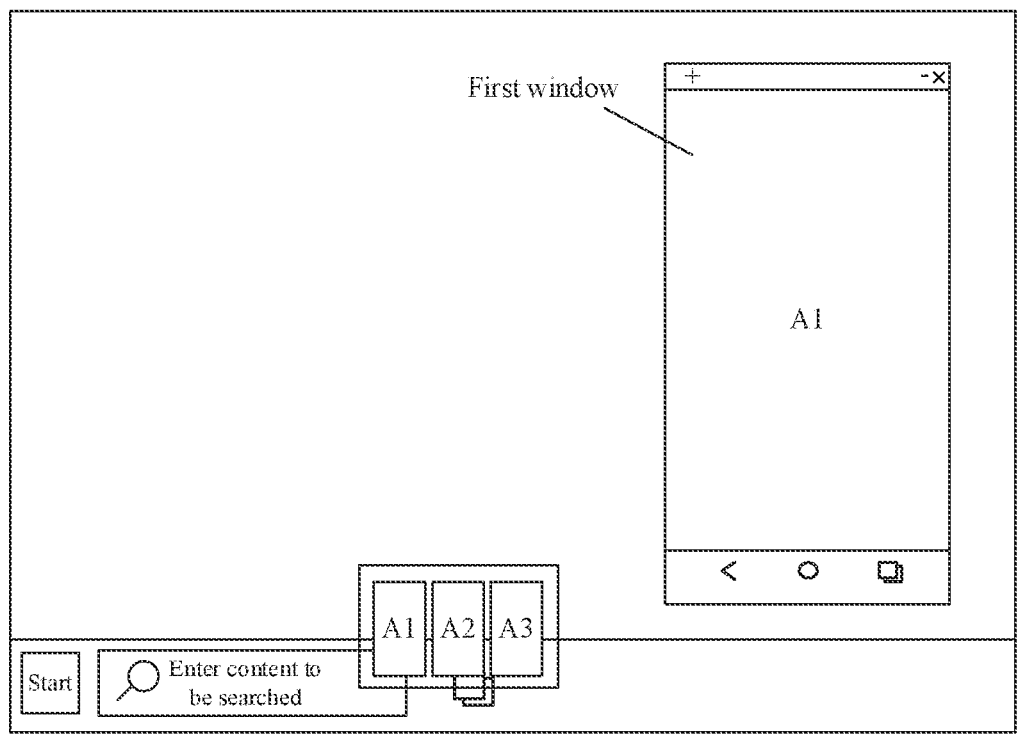
FIG. 8A is a schematic diagram of an example of a manner of opening a multi-window according to an embodiment of this application.
Figure 8A:
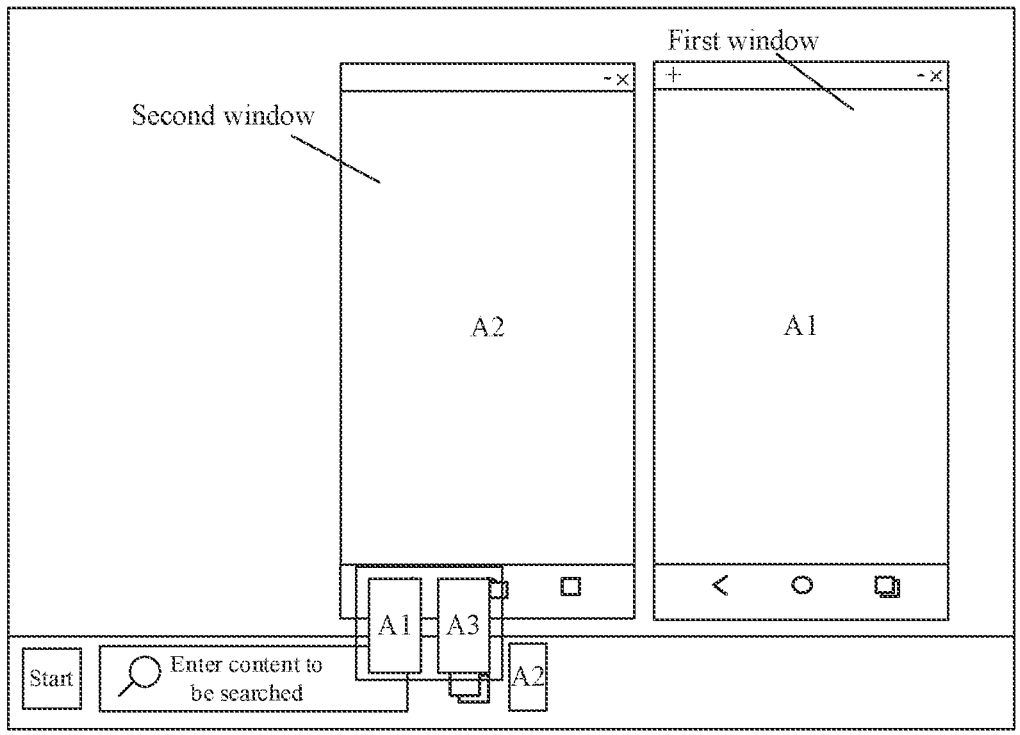

In the above example, the second window is a window opened in response to an operation on the window separation button "+" in the first window. It may be understood that the second window may alternatively be opened through another operation. For example, refer to (a) in FIG. 8A. When detecting that a mouse arrow is hovered over the multi-task button, the PC displays the multi-task box, where the multi-task box includes interface identifiers A1 to A3. When detecting an operation (for example, a hold and drag operation) on the interface identifier A2, the PC creates the second window, and displays the interface A2 in the second window. Refer to (b) in FIG. 8A.

Because the interface corresponding to A2 has been displayed in the second window, if the interface identifier A2 is still displayed in the multi-task box, there are many interface identifiers in the multi-task box. When the user wants to select an interface identifier from the multi-task box to attempt to open a corresponding interface, it cannot be quickly determined which interfaces are opened and which interfaces are not opened. Therefore, for ease of distinguishing, the identifier (for example, A2) of the interface opened in the multi-task box may be removed from the multi-task box and displayed independently of the multi-task button on the taskbar. Refer to (b) in FIG. 8A. A2 and the multi-task button are displayed in parallel on the taskbar.

Certainly, to save display space of the taskbar on the PC, the identifier of the interface displayed in the window may also continue to be displayed in the multi-task box, but is distinguished from an identifier of another interface. For example, refer to FIG. 8B. The multi-task box includes a sub-frame, A1 and A3 are displayed in the sub-frame, and A2 is not in the sub-frame. In this way, the user may quickly identify that the A2 interface is opened. Optionally, in FIG. 8A, the first window is used as the home screen, and an interface identifier of an interface in the home screen, namely, A1, may be displayed in the multi-task box, or may be displayed outside the multi-task box, for example, displayed outside the sub-frame as shown in FIG. 8B; or as A2 shown in (b) in FIG. 8A, may be displayed independent of the multi-task button in the taskbar.

Figure 8B:
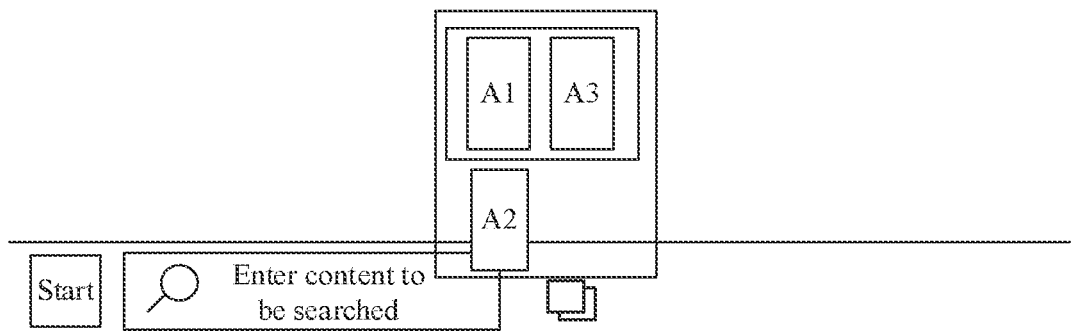
FIG. 8B is a schematic diagram of an example of a display manner of a multi-task button on a taskbar during multi-window display according to an embodiment of this application.

FIG. 8B is still used as an example. The interface identifiers A1 and A3 are displayed in the sub-frame. It is assumed that an operation (for example, a click or double-click operation) on A3 is detected, and the interface A3 may be displayed in either of the two windows (the first window and the second window). For example, display is performed in the primary window (for example, the first window), or display is performed in the focus window, or display is performed in the second window in which the interface A2 is located.

The following describes an electronic device provided in embodiments of this application.

Figure 9:
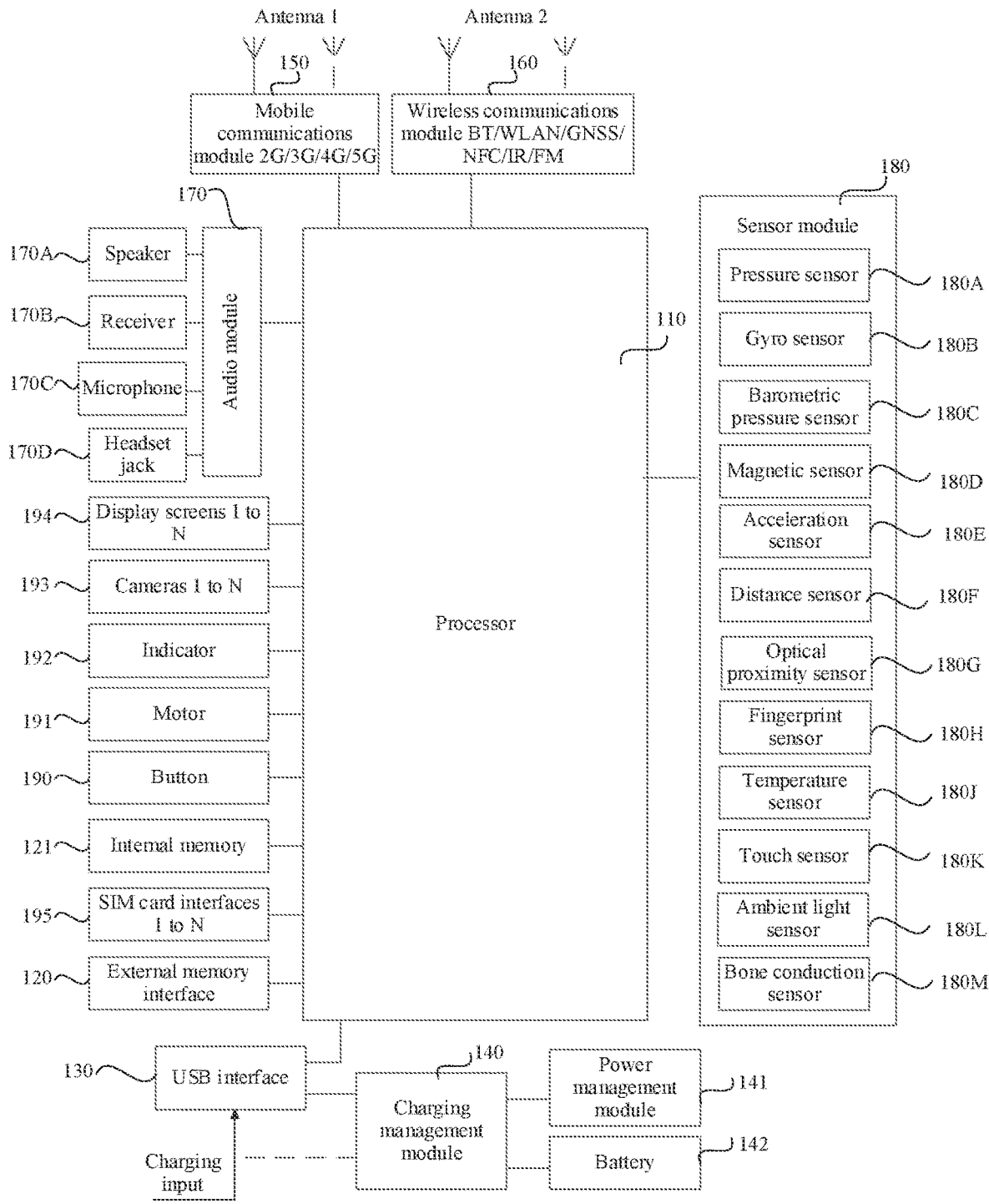
FIG. 9 is a schematic diagram of a hardware structure of an electronic device according to an embodiment of this application.

FIG. 9 is a schematic diagram of a structure of an electronic device. The electronic device may be the mobile phone mentioned above. As shown in FIG. 9, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors. The controller may be a nerve center and a command center of the electronic device. The controller may generate an operation control signal based on an instruction operation code and a time sequence signal, to complete control of instruction fetching and instruction execution. A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device, may be configured to transmit data between the electronic device and a peripheral device. The charging management module 140 is configured to receive a charging input from the charger. The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device may be implemented through the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna of the electronic device may be configured to cover one or more communication frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 150 may provide a solution that includes wireless communication such as 2G/3G/4G/5G and that is applied to the electronic device. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 may be disposed in a same device as at least some modules of the processor 110.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device. The wireless communications module 160 may be one or more devices integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communications module 150 are coupled, and the antenna 2 and the wireless communications module 160 are coupled, so that the electronic device can communicate with a network and another device by using a wireless communications technology. The wireless communications technology may include a global system for mobile communications (global system for mobile communications, GSM), a general packet radio service (general packet radio service. GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation systems, SBAS).

The display 194 is configured to display a display interface of an application, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The camera 193 is configured to capture a static image or a video. The camera 193 may include a front-facing camera and a rear-facing camera.

The internal memory 121 may be configured to store computer-executable program code. The executable program code includes instructions. The processor 110 runs the instructions stored in the internal memory 121, to perform various function applications and data processing of the electronic device. The internal memory 121 may include a program storage area and a data storage area. The program storage area may store an operating system, software code of at least one application (for example, iQIYI or WeChat), and the like. The data storage area may store data (for example, an image or a video) generated in a process of using the electronic device, and the like. In addition, the internal memory 121 may include a high-speed random access memory, and may further include a nonvolatile memory, for example, at least one magnetic disk storage device, a flash memory, or a universal flash storage (universal flash storage, UFS).

The external memory interface 120 may be configured to connect to an external storage card, for example, a micro SD card, to extend a storage capability of the electronic device. The external storage card communicates with the processor 110 through the external memory interface 120, to implement a data storage function. For example, a file such as an image or a video is stored in the external storage card.

The electronic device may implement audio functions through the audio module 170, the speaker 170A, the receiver 170B, the microphone 170C, the headset jack 170D, the application processor, and the like, for example, music play and recording.

The pressure sensor 180A is configured to sense a pressure signal, and can convert the pressure signal into an electrical signal. In some embodiments, the pressure sensor 180A may be disposed on the display 194. The gyro sensor 180B may be configured to determine a motion posture of the electronic device. In some embodiments, an angular velocity of the electronic device around three axes (namely, axes x, y, and z) may be determined through the gyro sensor 180B.

The gyro sensor 180B may be configured to implement image stabilization during photographing. The barometric pressure sensor 180C is configured to measure barometric pressure. In some embodiments, the electronic device calculates an altitude based on a value of the barometric pressure measured by the barometric pressure sensor 180C, to assist in positioning and navigation. The magnetic sensor 180D includes a Hall sensor. The electronic device may detect opening and closing of a flip cover through the magnetic sensor 180D. In some embodiments, when the electronic device is a flip phone, the electronic device may detect opening and closing of a flip cover through the magnetic sensor 180D. Further, a feature such as automatic unlocking upon opening of the flip cover is set based on a detected opening or closing state of the flip cover. The acceleration sensor 180E may detect magnitudes of accelerations of the electronic device in all directions (usually on three axes), and may detect a magnitude and a direction of gravity when the electronic device is stationary. The acceleration sensor 180E may be further configured to identify a posture of the electronic device, and is used in an application such as switching between landscape mode and portrait mode or a pedometer.

The distance sensor 180F is configured to measure a distance. The electronic device may measure the distance through infrared or laser. In some embodiments, in a photographing scenario, the electronic device may measure the distance through the distance sensor 180F, to implement quick focusing. The optical proximity sensor 180G may include a light-emitting diode (LED) and an optical detector, for example, a photodiode. The light-emitting diode may be an infrared light-emitting diode. The electronic device emits infrared light through the light-emitting diode. The electronic device detects reflected infrared light from a nearby object through the photodiode. When detecting sufficient reflected light, the electronic device may determine that there is an object near the electronic device. When detecting insufficient reflected light, the electronic device may determine that there is no object near the electronic device. The electronic device may detect, through the optical proximity sensor 180G, that the user holds the electronic device close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device is in a pocket, to avoid an unintentional touch. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may be alternatively disposed on a surface of the electronic device, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal.

The button 190 includes a power button, a volume button, and the like. The button 190 may be a mechanical button, or may be a touch button. The electronic device may receive a button input, and generate a button signal input related to user settings and function control of the electronic device. The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device.

It may be understood that the components shown in FIG. 9 do not constitute a specific limitation on the mobile phone. The mobile phone in this embodiment of the present invention may include more or fewer components than those in FIG. 9. In addition, a combination/connection relationship between the components in FIG. 9 may also be adjusted and modified.

Figure 10:
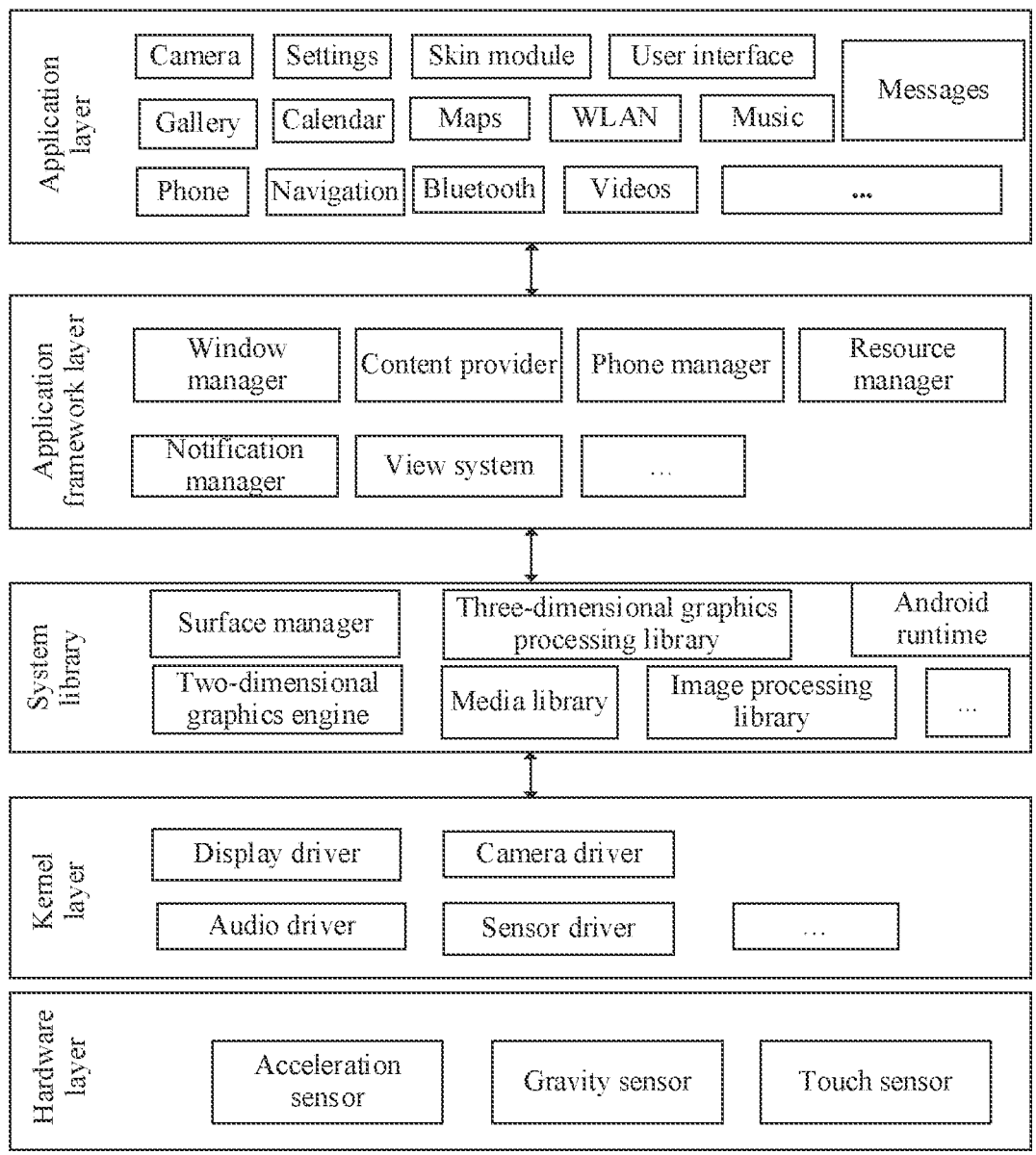
FIG. 10 is a schematic diagram of a software structure of an electronic device according to an embodiment of this application.

FIG. 10 is a block diagram of a software structure of an electronic device according to an embodiment of this application. The electronic device may be, for example, the mobile phone mentioned above. As shown in FIG. 10, the software structure of the electronic device may be a layered architecture. For example, software may be divided into several layers, and each layer has a clear role and responsibility. The layers communicate with each other through a software interface. In some embodiments, an Android system is divided into four layers: an application layer, an application framework (framework, FWK) layer, an Android runtime (Android runtime) and system library; and a kernel layer from top to bottom.

The application layer may include a series of application packages. As shown in FIG. 10, the application layer may include "Camera", "Settings", a skin module, a user interface (user interface, UI), a third-party application, and the like. The third-party application may include "WeChat", "QQ", "Gallery", "Calendar", "Phone", "Maps", "Navigation", "WLAN", "Bluetooth", "Music", "Videos", "Messages", and the like.

The application framework layer provides an application programming interface (application programming interface, API) and a programming framework for an application at the application layer. The application framework layer may include some predefined functions. As shown in FIG. 10, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and so on. The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a notification icon of Messages may include a text display view and a picture display view.

The phone manager is configured to provide a communication function of the electronic device, for example, management of a call status (including answering, declining, or the like).

The resource manager provides, for an application, various resources such as a localized character string, an icon, a picture, a layout file, and a video file.

The notification manager enables an application to display notification information on the status bar, and may be configured to transmit a notification-type message. The displayed information may automatically disappear after a short pause without user interaction. For example, the notification manager is configured to notify download completion, provide a message notification, and so on. The notification manager may alternatively be a notification that appears on a top status bar of the system in a form of a graph or a scroll bar text, for example, a notification of an application running on the background or a notification that appears on a screen in a form of a dialog window. For example, text information is displayed on the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android. The application layer and the application framework layer run on a virtual machine. The virtual machine executes java files at the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (media library), a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system database may further include a backup judging module, configured to determine whether a file exists in a list of backed up files. For example, when the file exists in the list of backed up files, the backup judging module determines that the file does not need to be backed up. For another example, when the file does not exist in the list of backed up files, the backup judging module determines that the file needs to be backed up.

The kernel layer is a layer between hardware and software. The kernel layer includes at least a display driver, a camera driver, an audio driver, and a sensor driver.

The hardware layer may include various types of sensors, for example, an acceleration sensor, a gyroscope sensor, and a touch sensor in this embodiment of this application.

In embodiments provided in this application, the method provided in embodiments of this application is described from a perspective in which an electronic device (for example, a PC) is used as an execution body. To implement the functions in the method provided in the foregoing embodiments of this application, the electronic device may include a hardware structure and/or a software module, to implement the functions in a form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

According to the context, the term "when . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedure or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The available medium may be a magnetic medium (for example, a floppy disk, a hard disk, or a magnetic tape), an optical medium (for example, a DVD), a semiconductor medium (for example, a solid state disk Solid State Disk (SSD)), or the like. In a case in which no conflict occurs, the solutions in the foregoing embodiments may be combined for use.

It should be noted that a part of this patent application document includes copyright protected content. The copyright owner reserves the copyright except copies are made for the patent documents or the recorded content of the patent documents in the Patent Office.

What is claimed is:

1. A navigation bar display method implemented by a first electronic device, wherein the navigation bar display method comprises:
   receiving, from a second electronic device, first interface information and second interface information;
   displaying, in a first window based on the first interface information, a first interface of the second electronic device;
   displaying, in a second window based on the second interface information, a second interface of the second electronic device;
   displaying, adjacent the first and second windows, a navigation bar comprising at least one button;
   receiving a first operation on the at least one button;
   receiving, from the second electronic device and in response to the first operation, third interface information of a third interface of the second electronic device;
   displaying the third interface in the first window when the first window is a focus window; and
   displaying the third interface in the second window when the second window is the focus window,
   wherein the first and second windows share the navigation bar.

2. The navigation bar display method of claim 1, further comprising:
   further displaying, on a display screen of the first electronic device in a hovering manner, the navigation bar.

3. The navigation bar display method of claim 1, further comprising:
   further displaying the navigation bar at a first position;
   receiving a second operation on the navigation bar; and
   further displaying, at a second position and in response to the second operation, the navigation bar, wherein the first position is different from the second position.

4. The navigation bar display method of claim 1, further comprising:
   receiving a second operation on a first button on the navigation bar; and
   removing, in response to the second operation and from the navigation bar, the first button to display the first button.

5. The navigation bar display method of claim 1, further comprising:
receiving a second operation on the navigation bar; and
changing, in response to the second operation, the at least one button.

6. The navigation bar display method of claim 1, wherein the at least one button comprises:
a back button for returning to a previous step.

7. The navigation bar display method of claim 1, further comprising replacing one of the at least one button on the navigation bar with a different button.

8. A first electronic device comprising:
a memory configured to store instructions; and
a processor coupled to the memory and configured to execute the instructions to cause the first electronic device to:
receive, from a second electronic device, first interface information and second interface information;
display, in a first window and based on the first interface information, a first interface of the second electronic device;
display, in a second window and based on the second interface information, a second interface of the second electronic device;
display, adjacent the first and second windows, a navigation bar comprising at least one button;
receive a first operation on the at least one button;
receive, from the second electronic device and in response to the first operation, third interface information of a third interface of the second electronic device;
display the third interface in the first window when the first window is a focus window; and
display the third interface in the second window when the second window is the focus window,
wherein the first and second windows share the navigation bar.

9. The first electronic device of claim 8, further comprising:
a display screen; and
a taskbar,
wherein the processor is further configured to execute the instructions to cause the first electronic device to:
further display the navigation bar on the taskbar.

10. The first electronic device of claim 8, wherein the processor is further configured to execute the instructions to cause the first electronic device to:
further display the navigation bar at a first position;
receive a second operation on the navigation bar; and
further display, at a second position and in response to the second operation, the navigation bar, wherein the first position is different from the second position.

11. The first electronic device of claim 8, wherein the processor is further configured to execute the instructions to cause the first electronic device to:
receive a second operation on a first button on the navigation bar; and
remove, in response to the second operation and from the navigation bar, the first button to display the first button.

12. The first electronic device of claim 8, wherein the processor is further configured to execute the instructions to cause the first electronic device to:
receive a second operation on the navigation bar; and
change, in response to the second operation, the at least one button.

13. The first electronic device of claim 8, wherein the at least one button comprises:
a home button for returning to a home screen.

14. The first electronic device of claim 8, wherein the processor is further configured to execute the instructions to cause the first electronic device to replace one of the at least one button on the navigation bar with a different button.

15. A first electronic device comprising:
a memory configured to store instructions; and
a processor coupled to the memory and configured to execute the instructions to cause the first electronic device to:
receive, from a second electronic device, N pieces of interface information of N interfaces, wherein N is an integer greater than 1;
display, based on the N pieces of interface information, the N interfaces in N windows; and
display, adjacent the N windows, a navigation bar comprising at least one button, wherein the at least one button controls the N interfaces based on which of one of the N windows is a focus window,
wherein the N windows share the navigation bar.

16. The first electronic device of claim 15, wherein the at least one button comprises:
a multi-task button for opening a multi-task; or
a forward button for entering a next step.

17. The first electronic device of claim 15, wherein N is greater than or equal to 2, and wherein the processor is further configured to execute the instructions to cause the first electronic device to:
receive a first operation on the at least one button;
receive, from the second electronic device and in response to the first operation, first interface information; and
display, based on the first interface information, an interface of the second electronic device in a focus window in the N windows, wherein the interface is different from the N interfaces, and wherein the first interface information is different from the N pieces of interface information.

18. The first electronic device of claim 15, wherein the N windows comprise a first window, wherein the N interfaces comprise a first interface, and wherein the processor is further configured to execute the instructions to cause the first electronic device to:
display the first interface in the first window;
receive a first operation on the at least one button;
display, in response to the first operation, M interface identifiers and a first interface identifier, wherein the first interface identifier represents the first interface, wherein the M interface identifiers represent M interfaces of the second electronic device, and wherein M is an integer greater than or equal to 1;
receive a second operation of selecting a second interface identifier from the M interface identifiers; and
display, in response to the second operation, a second interface in the first window, wherein the second interface identifier is of the second interface.

19. The first electronic device of claim 15, wherein the processor is further configured to execute the instructions to cause the first electronic device to:
receive a first operation on the at least one button;
display, in response to the first operation, L interface identifiers, wherein the L interface identifiers represent L interfaces of the second electronic device, and wherein L is an integer greater than or equal to 1;
receive a second operation of selecting a first interface identifier from the L interface identifiers; and display, in response to the second operation, an interface in an $(N+1)^{th}$ window, wherein the first interface identifier is of the interface, and wherein the $(N+1)^{th}$ window is different from the N windows.

20. The first electronic device of claim 15, wherein the processor is further configured to execute the instructions to cause the first electronic device to replace one of the at least one button on the navigation bar with a different button.

* * * * *